United States Patent [19]

Tom et al.

[11] Patent Number: 5,262,625
[45] Date of Patent: Nov. 16, 1993

[54] MULTIPLE BAR CODE DECODING SYSTEM AND METHOD

[75] Inventors: Robert J. Tom, Zanesville; Wilbur I. Hilles; Barry M. Mergenthaler, both of Cambridge, all of Ohio; Denis M. Blanford, Duluth, Ga.

[73] Assignee: NCR Corporation, Dayton, Ohio

[21] Appl. No.: 793,934

[22] Filed: Nov. 15, 1991

[51] Int. Cl.⁵ .................. G06K 7/14; G06K 9/00; G06K 7/10
[52] U.S. Cl. ................... 235/462; 235/462; 235/472
[58] Field of Search ........... 235/462, 463, 467, 472, 235/473

[56] References Cited

U.S. PATENT DOCUMENTS

| | | | |
|---|---|---|---|
| 4,057,784 | 11/1977 | Tafoya | 235/467 |
| 4,282,426 | 8/1981 | Neseem et al. | 235/463 |
| 4,289,957 | 9/1981 | Neyroud et al. | 235/462 |
| 4,333,006 | 6/1982 | Gorin et al. | 235/467 |
| 4,354,101 | 10/1982 | Hester et al. | 235/454 |
| 4,382,279 | 5/1983 | Ugon | 364/200 |
| 4,409,469 | 10/1983 | Yasuda et al. | 235/463 |
| 4,418,276 | 11/1983 | Yatsunami | 235/467 |
| 4,450,519 | 5/1984 | Guttag et al. | 364/200 |
| 4,704,519 | 11/1987 | Kulikauskas | 235/472 |
| 4,721,849 | 1/1988 | Davis et al. | 235/472 |
| 4,816,823 | 3/1989 | Polkinghorne et al. | 340/825.15 |
| 4,855,581 | 8/1989 | Mertel et al. | 235/462 |
| 4,878,174 | 10/1989 | Watkins et al. | 364/200 |
| 4,937,811 | 6/1990 | Harris | 370/5 |
| 4,973,829 | 11/1990 | Ishida et al. | 235/462 |
| 4,991,010 | 2/1991 | Hailey et al. | 364/724.1 |
| 5,128,527 | 7/1992 | Kawai et al. | 235/463 |
| 5,194,722 | 3/1993 | Mergenthaler et al. | 235/463 |

*Primary Examiner*—Edward P. Westin
*Assistant Examiner*—S. B. Allen
*Attorney, Agent, or Firm*—Albert L. Sessler, Jr.; Richard W. Lavin

[57] ABSTRACT

There are disclosed a system and method for decoding data read from a plurality of different types of bar code labels which includes circuit means for detecting the occurrence of two equal continuous characters in the data generated by an optical scanner in reading a bar code label and a filter for each of the different bar code labels receiving simultaneously the two equal characters for decoding the character data and inserting locating bits in the data delimiting a valid character in the data.

25 Claims, 27 Drawing Sheets

| DECIMAL NUMBER | LEFT SIDE (ODD PARITY) | RIGHT SIDE (EVEN PARITY) |
|---|---|---|
| 0 | 0 0 0 1 1 0 1 | 1 1 1 0 0 1 0 |
| 1 | 0 0 1 1 0 0 1 | 1 1 0 0 1 1 0 |
| 2 | 0 0 1 0 0 1 1 | 1 1 0 1 1 0 0 |
| 3 | 0 1 1 1 1 0 1 | 1 0 0 0 0 1 0 |
| 4 | 0 1 0 0 0 1 1 | 1 0 1 1 1 0 0 |
| 5 | 0 1 1 0 0 0 1 | 1 0 0 1 1 1 0 |
| 6 | 0 1 0 1 1 1 1 | 1 0 1 0 0 0 0 |
| 7 | 0 1 1 1 0 1 1 | 1 0 0 0 1 0 0 |
| 8 | 0 1 1 0 1 1 1 | 1 0 0 1 0 0 0 |
| 9 | 0 0 0 1 0 1 1 | 1 1 1 0 1 0 0 |

1 : BLACK        0 : WHITE

UPC SYMBOL

UPC SYMBOL

SYMBOL STRUCTURE

- QUIET ZONE
- START CHARACTER (CODE 0)
- DATA (25)
- CHECK CHARACTER
- STOP CHARACTER
- QUIET ZONE

ENCODING THE MESSAGE "A"

QUIET ZONE | START CHAR. | "1" | "A" | STOP CHAR. | QUIET ZONE

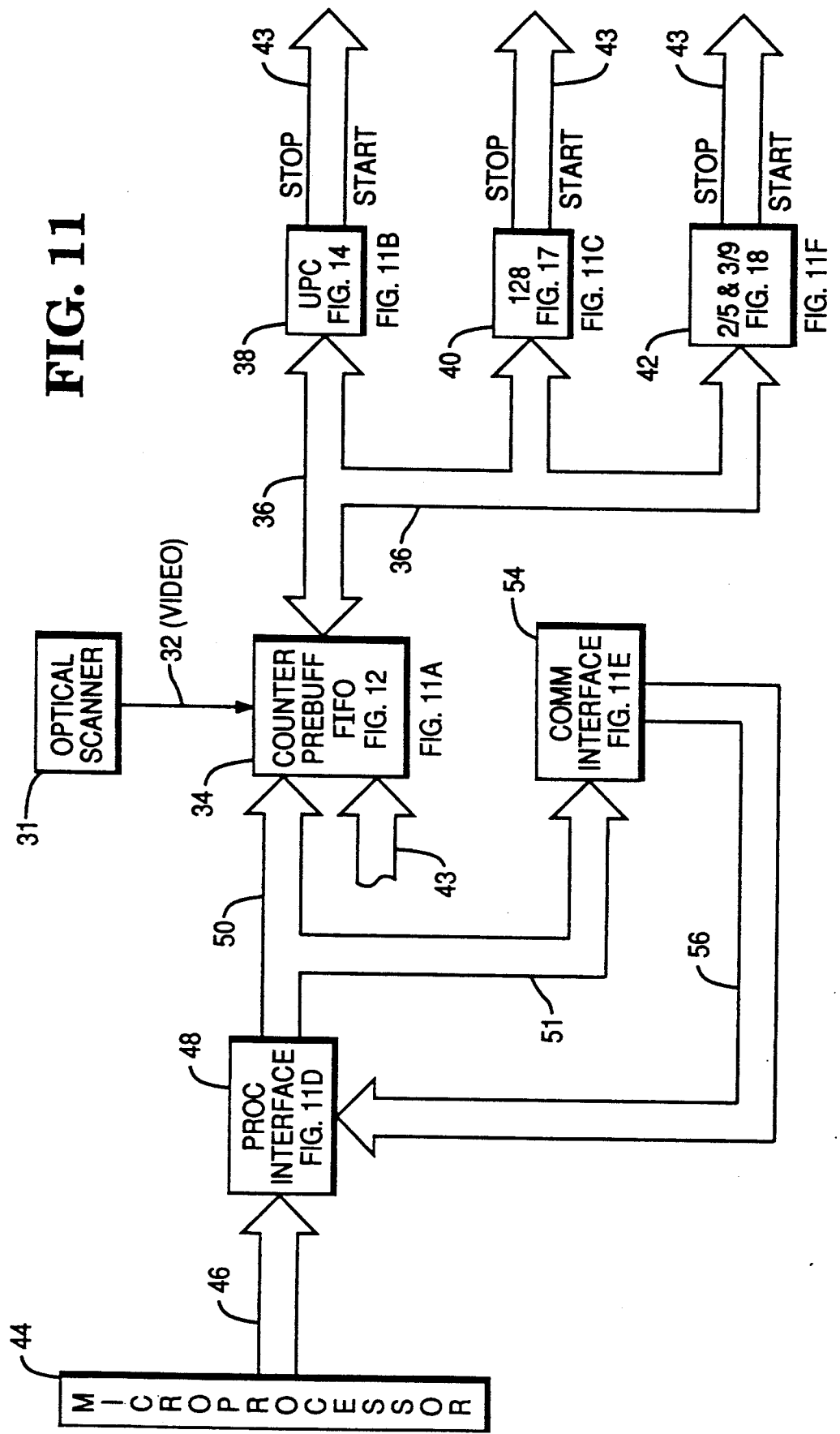

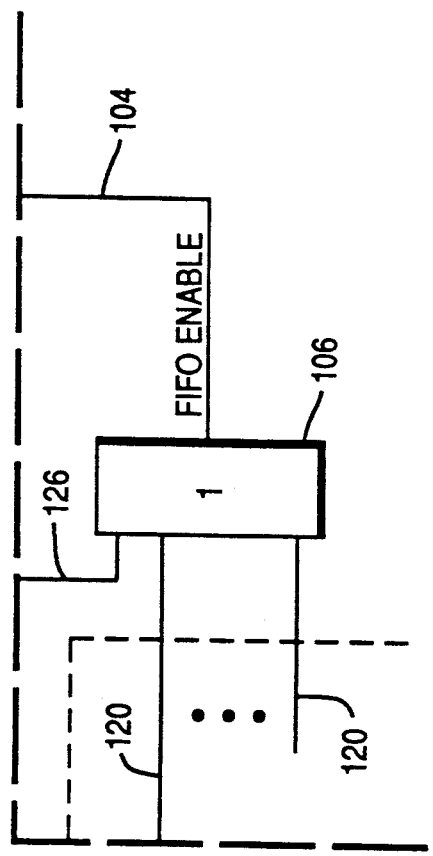

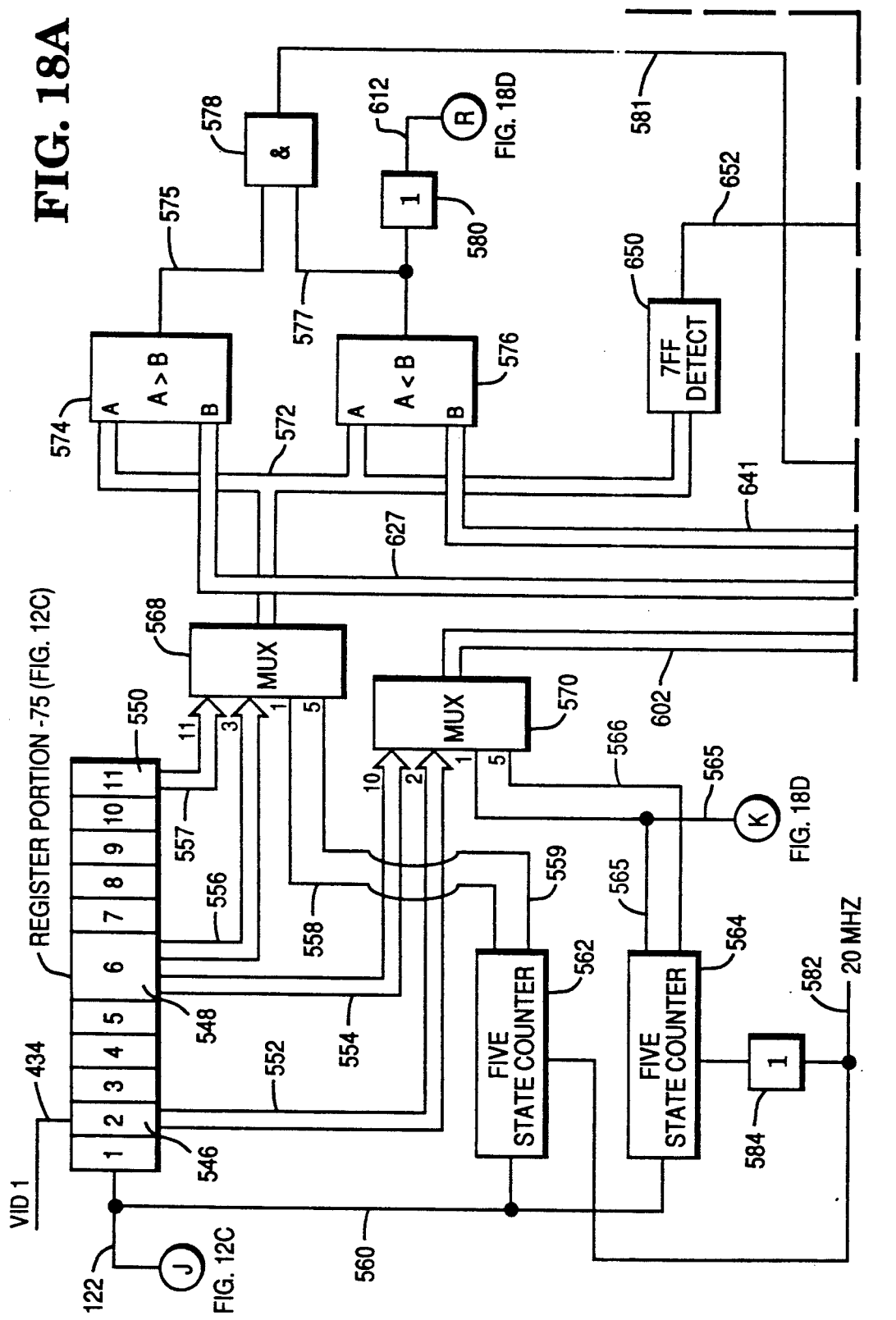

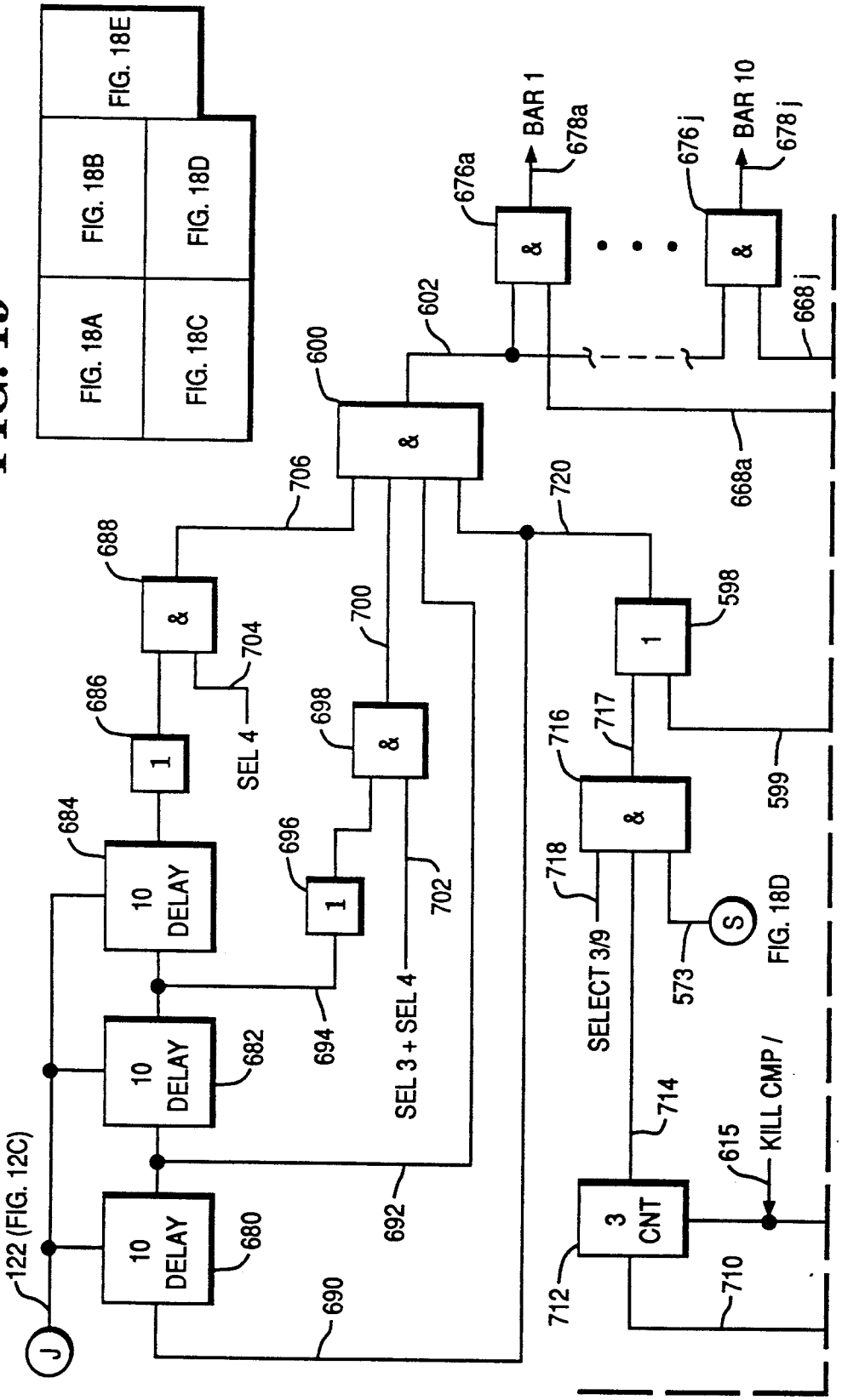

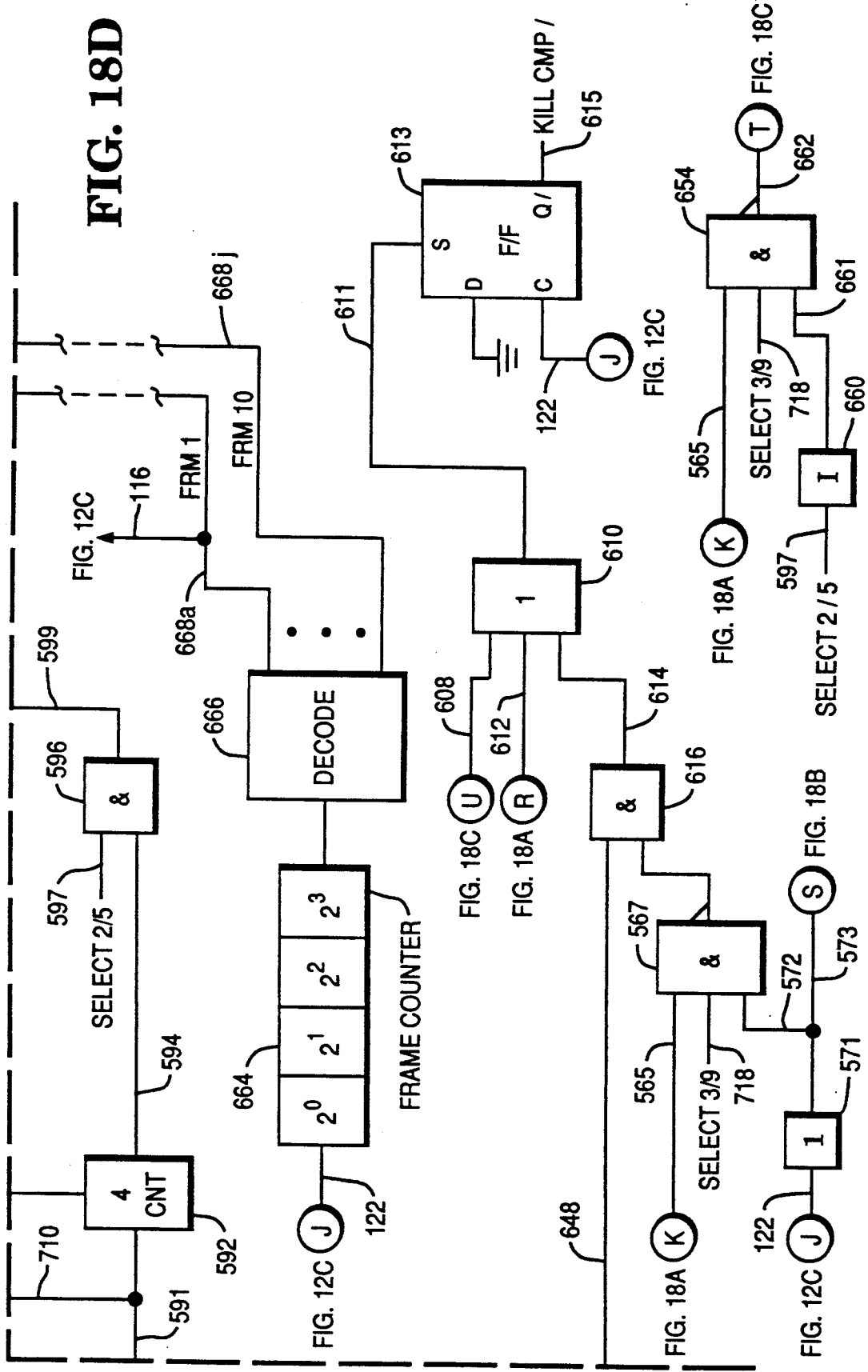

MULTIPLE BAR CODE DECODING SYSTEM AND METHOD

BACKGROUND OF THE INVENTION

The present invention relates to a system for decoding a high density multiple bar code on a record medium at a high rate of speed and more particularly, relates to a bar code decoding system which includes a CMOS/LSI CHIP for decoding a plurality of bar code labels which may be on a purchased merchandise item.

The use of bar code symbols or labels intended to be read by optical scanning equipment as a means for identifying new data useful in processing items sold in a retail industry has been widely accepted to the point that a particular bar code known as the Universal Product Code (UPC) has been established as the industry standard for the grocery and other related retail industries. In a multiple bar code, such as the UPC, each decimal number or numerical character is represented by two pairs of vertical bars and spaces within a 7-bit pattern wherein a binary 1 bit is represented by a dark module or bar of a predetermined width and the binary 0 bit is represented by a light module or a space. Thus, the decimal or character 1 may be represented in the UPC code by the 7-bit pattern 0011001. In keeping with this format, the decimal 1 would be comprised of an initial space of a 2-bit width, followed by 2-bit wide bar, another 2-bit space and a 1-bit wide bar. For each character or decimal of the system there are two bars and two spaces which have a total width of 7 modules or bits. The width of each of the bars or spaces which comprise a character may be 1, 2, 3 or 4 modules wide as long as the sum of the bars and spaces is seven bits or modules wide. Where the merchandise item is of a size that will not accommodate a standard UPC label, other bar codes have been generated such as code 128 where every character is constructed of eleven bars and spaces, code 2 of 5 where two characters are paired together using bars to represent the first character and spaces to represent the second character and code 3 of 9 where each character is represented by five bars and four intervening spaces comprising three wide and six narrow elements.

A multiple bar code, such as the UPC, is normally read by an optical scanner which may take the form of a hand-held wand or a scanner mechanism located in a checkout counter. The optical scanner will scan the bar code pattern and generate signals representing the bars and spaces for transmission to the processing apparatus which determines the character represented by the bar code pattern.

Prior optical readers generally store the electrical signals generated as a result of scanning a bar code pattern until the accumulated signals stored are sufficient to allow the processing apparatus to initiate a recognition operation to determine the character represented by the scanned bar code pattern. Because of the speed in which the scanning operation is performed, the scanning operation has to be repeated until the accumulated signals represent full bar code label. Each prior scanner was programmed to read either one type of bar code or process one type of bar code at a time. Where a scanner was programmed to read more than one type of bar code, the scanner would decode the accumulated data signals one code at a time which slowed the checkout operation considerably.

SUMMARY OF THE INVENTION

There is disclosed a system for simultaneously decoding a plurality of different coded symbols each comprising a plurality of bars and spaces representing characters comprising means for generating data representing bars and spaces of one of said symbols, circuit means coupled to said generating means for applying first predetermined relationships to said data for generating signals representing continuous equal width characters in response to receiving the data representing each consecutive bar and space whenever the relationships are satisfied, means for storing the data, a plurality of decoding means coupled to said circuit means for simultaneously receiving said signals for detecting valid and invalid characters in said signals and each of said decoding means including means for inserting data bits in the data stored in said storing means for locating the start and ending of a valid character in said data.

It is therefore a principal object of this invention to provide a bar code decoding system which can decode a plurality of different bar codes to provide a high rate of valid reading operations.

It is another object of this invention to provide an improved decoding system for decoding simultaneously data which may represent more than one bar code label.

BRIEF DESCRIPTION OF THE DRAWINGS

These and other objects, features and advantages of the invention, as well as the invention itself, will become more apparent to those skilled in the art in light of the following detailed description, taken into consideration with the accompanied drawings, wherein like reference numerals indicate like or corresponding parts throughout the several views and wherein:

FIG. 11 is a block diagram of the bar code reading system in which the present invention is incorporated;

FIGS. 12A-12D inclusive form a detailed block diagram of the counter, prebuffer and FIFO control blocks of FIG. 11 and 11A;

FIG. 13 is a diagram of how FIGS. 12A-12D inclusive are assembled;

FIGS. 18A-18E inclusive taken together form a detailed block diagram of the codes 2 of 5 and 3 of 9 filters of FIGS. 11 and 11F;

FIGS. 19 is a diagram showing how FIGS. 18A-18E inclusive are arranged;

DESCRIPTION OF THE REFERRED EMBODIMENT

Figure 1:
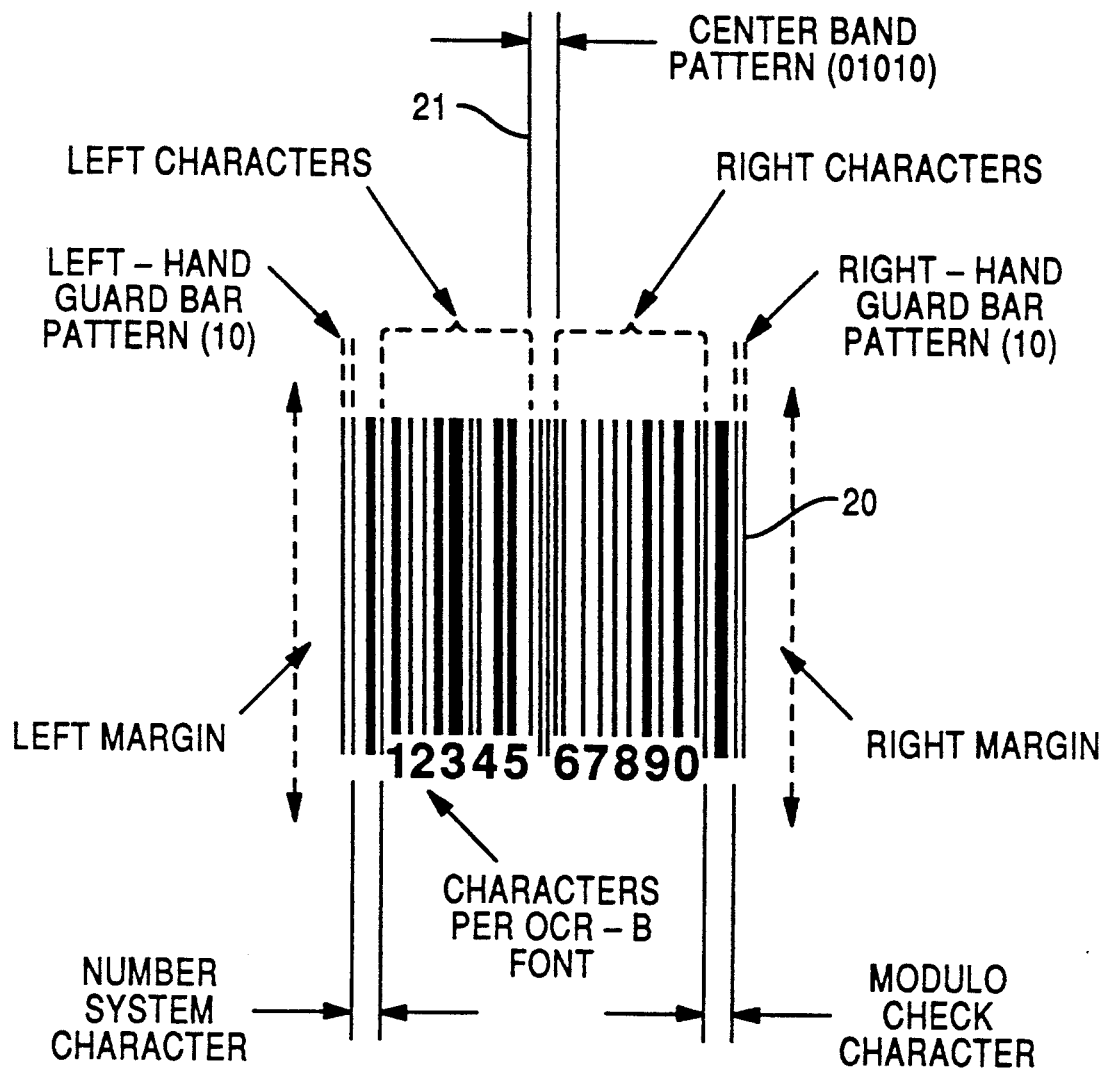
FIG. 1 is a graphical representation of a symbol or coded label such as a UPC coded symbol.

Referring now to FIG. 1, there is shown a graphical representation of a UPC symbol or coded label 20. The UPC symbol 20 is made up of a series of light and dark parallel bars which comprise twelve characters. Among the twelve characters, two characters are of the industry code and module check characters and the remaining ten characters are of the main code representing numerical data associated with a merchandise item. Normally this data represents the identity of the item which is used to obtain the price of the item. As shown in FIG. 1, included in the label is a readable number printed in OCR-B font. In addition to the series of light and dark parallel bars, the UPC symbol includes spaces on both sides which are referred to as the left and right margins. Other characteristics of the UPC symbol include the following:

(1) The overall shape of the symbol is a rectangle;

(2) Each character of a UPC code is represented by two dark bars and two light spaces;

(3) Each character is comprised of seven equal data elements called modules;

(4) Each module can be light or dark;

(5) Each bar may be composed of 1, 2, 3 or 4 dark modules. Light spaces may also be composed of 1, 2, 3 or 4 modules;

(6) Each character is independent;

(7) The right-most character of the symbol is a modulo check character while the left-most character of the symbol indicates a system in which this symbol is encoded;

(8) The size of the UPC symbol is variable, that is, it may be large or small without affecting its readability. The UPC symbol may consist of only six characters having the same arrangement as shown in FIG. 1;

(9) The series of light and dark parallel bars are separated from the margins on each side by left and right guard bar patterns and include a center band pattern 21 located at the center of the UPC symbol.

Figures 2, 3:
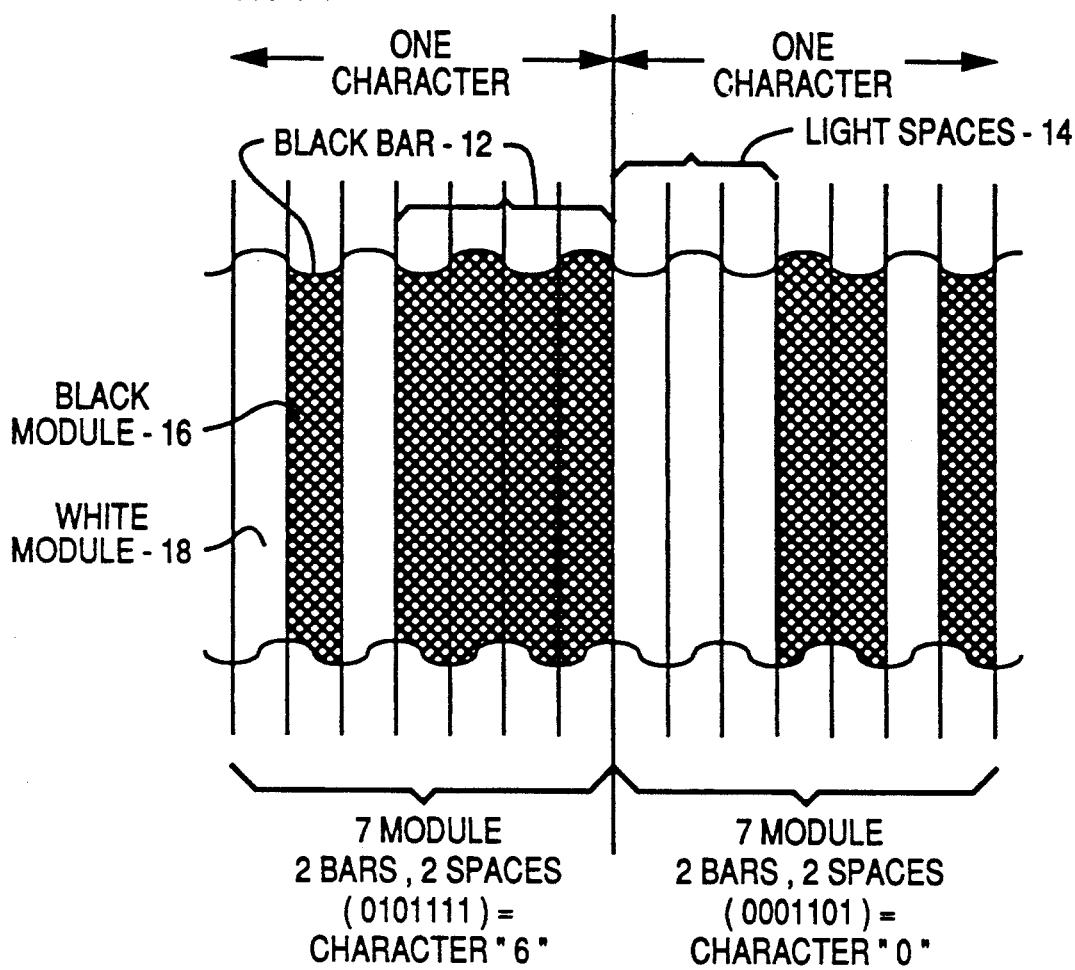
FIG. 2 is a graphical representation of the character structure of the UPC symbol.
FIG. 3 is a table showing the code structure of the UPC symbol character.

Referring now to FIG. 2, there is shown a graphical representation of the character structure of the UPC symbol. As shown, each encoded UPC character is made up of two dark bars 12 and two light spaces 14, each composed of a different number of modules. By assigning a 1 which corresponds to the black module 16, and a zero, which corresponds to a white module 18, the left hand character represents (0101111) which denotes the character 6, and the right hand character represents (0001101) which denotes the character 0. The structure of the character code is not uniquely determined by each character, but is different according to which side of the center band pattern the character is located on. It is also arranged that the light modules and the black modules are reversed as the character is located on the right or left side of the symbol 20, and as a result an odd number of black modules is included in each character code on the left hand side and a even number of black modules is included in each character code on the right hand side of the symbol, as indicated in FIG. 3. This parity relation provides information for determining the read-out direction of the symbol. With this arrangement, the left-hand characters always start with light bars and the right-hand characters always start with dark bars (reading left to right). The whole structure of the character codes is as shown in the Table in FIG. 3. It should be noted that a number of dark modules in each of the left side characters is always three or five, while the number of dark modules is always two or four in the right hand characters. These characteristics are used as a parity check. The left side characters have odd parity while the right side characters have even parity.

Figure 4:
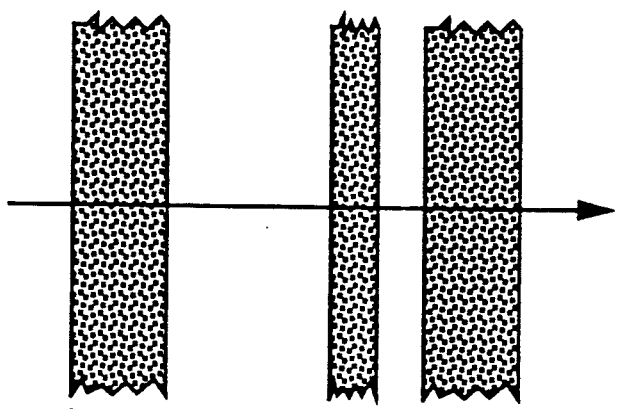
FIGS. 4 and 5 are graphical representations of the bar pattern and the transformed binary symmetrical signal respectively.
Figure 5:
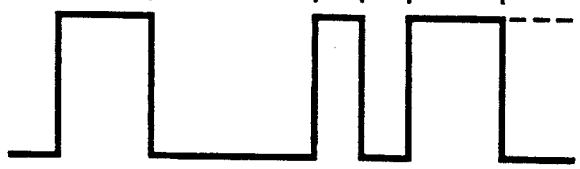

After a character is scanned, each module is assigned a binary value. Thus, as shown in FIGS. 4 and 5, scanning of the modules in the direction as noted, a binary 1 signal is generated upon the sensing of a black bar, while a binary 0 signal is generated upon the sensing of a light bar or space. Because of problems in printing, it is uncommon for the width of the light bar and the black bar to be of the ideal value. Therefore, in decoding the UPC symbol, this condition must be taken into consideration.

In addition, the tolerances for a UPC symbol or a tag are larger for the space that starts or ends a character. Because of the print condition of the bar and space alluded to above, it has been found that the dimension tolerances between similar edges are better than between dissimilar edges. That is, measuring the distances between the trailing edges of adjacent bars and spaces, or measuring the distances between the leading edges of adjacent bars and spaces, produces data which gives high recognition efficiency to the system.

Referring to FIG. 1, it will be seen that a bar code symbol 20 has left and right margins and a center band portion of the code. When scanning from left to right as viewed in FIG. 1, the left margin will be characterized as the in margin while the right margin will be characterized as the out margin. Similarly, the left portion of the center band will be characterized as the in center band and the right portion of the center band will be characterized as the out center band. These characteristics are reversed when the scanning takes place from a right to left direction. It will thus be seen that upon the scanning of each interval, the system will apply the above cited logic tests to determine the characteristics of the scanned interval, which characteristics are embodied as part of a binary hexadecimal number together with the additional binary bits generated for use in recognizing a character contained in the hexadecimal number being outputted at that time. As pointed out previously, each interval scanned will result in the outputting of a hexadecimal number which contains four binary-coded decimal (BCD) bits with only a portion of the hexadecimal numbers outputted being valid. For a complete disclosure of the procedure for decoding a UPC symbol, reference should be made to U.S. Pat. No. 4,282,426, which issued Aug. 4, 1981 on the application of Naseem et al and which is assigned to the assignee of the present invention.

Figure 6:
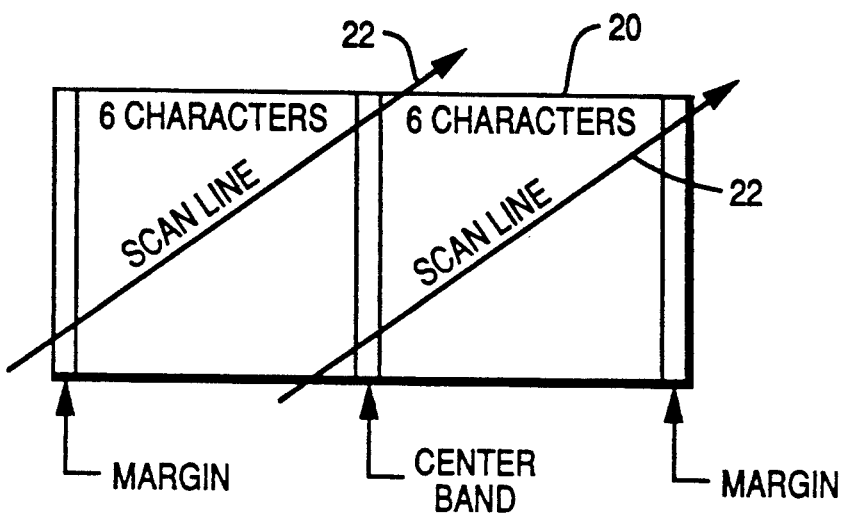
FIG. 6 is a graphical representation of a UPC symbol showing the path of the scan lines for scanning a complete bar code label.
Figure 7:
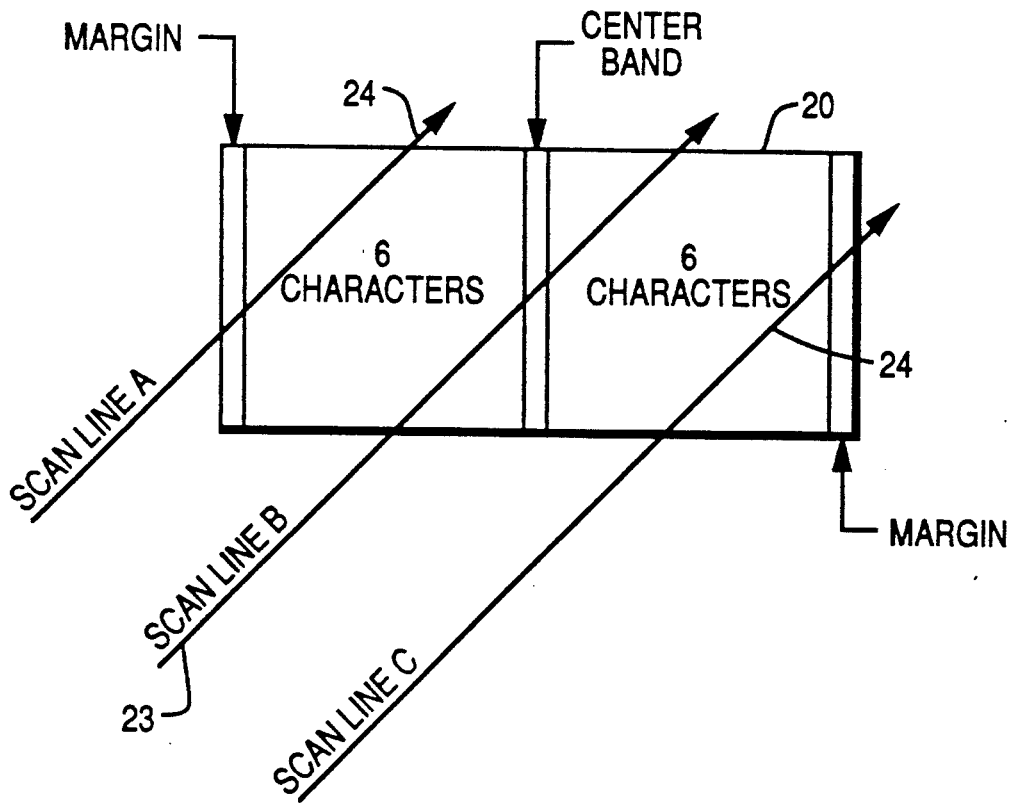
FIG. 7 is a graphical representation of a UPC symbol showing the path of the scan lines for producing partial readings of the bar code label which are combined by the present invention to produce a valid reading of the full UPC symbol.

Referring to FIG. 6, there is shown a diagrammatic representation of a UPC symbol 20 being scanned by scan lines 22. As shown, each scan line 22 will scan a half a label which includes either an in margin plus six characters and an in center band or an out center band, six characters and an out margin. The half symbols are put together to form a full symbol. In the present invention, as illustrated in FIG. 7, the scan lines 24 (lines A and C) scan a portion of the symbol 20 without scanning both a margin and the center band, while the scan line B scans the center band and portions of numerical characters in both the left and right side portions of the symbol 20.

Figure 8:
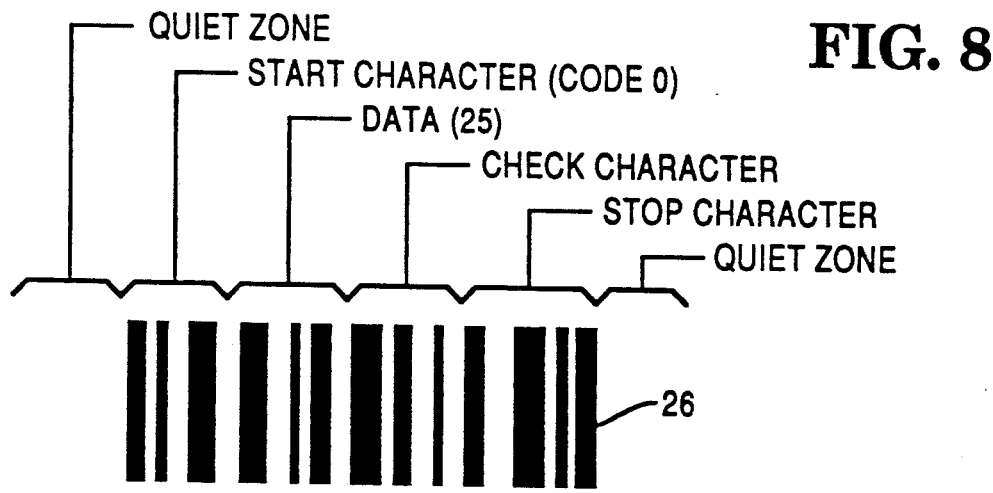
FIG. 8 is a graphical representation of a code 128 label.

Referring to FIG. 8, there is shown a graphical representation of the CODE 128 symbol or coded label 26. The 128 symbol consists of a series of bar coded characters framed by clear areas called quiet zones. The bar coded character series begins with a unique start character, followed by data and special characters with the most significant character adjacent to the start character, the check character and the unique stop character. Each character consists of 11 modules wherein each module can be either printed as a bar or part of a bar, or not printed and therefore represents a space or part of a space. Each character is comprised of three bars and three spaces, with each bar or space containing one to four modules. Character parity is defined by the sum of the printed modules in any character being even and the sum of non-printed modules in any character being odd.

Figure 9:
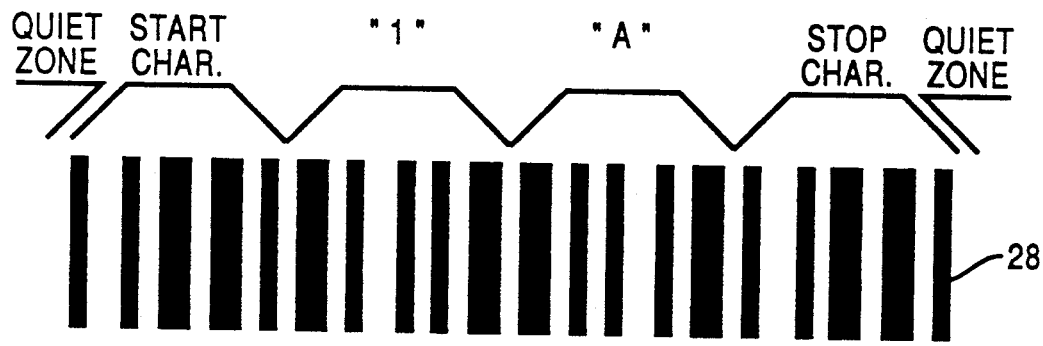
FIG. 9 is a graphical representation of a code 3 of 9 label.

Referring to FIG. 9, there is shown a graphical representation of a CODE 3 of 9 symbol or coded label 28. Each 3 of 9 symbol consists of a series of characters, each represented by five bars and four intervening spaces. Each character is separated by an intercharacter gap 29. Each bar or space can be one of two alternative widths, referred to as "wide" and "narrow". The particular pattern of wide and narrow bars determines the character being coded. In all cases, each character consists of three wide and six narrow elements. The name 3 of 9 is derived from its code structure which is three wide elements out of a total of nine elements. Included in the symbol is a start/stop character which is used to identify the leading and trailing ends of the bar code symbol. It is a unique character which allows the symbol to be scanned bidirectionally. The symbol further includes quiet zones which are free of printing and precede the start character and follow the stop character and which are free of all printing.

Figure 10:
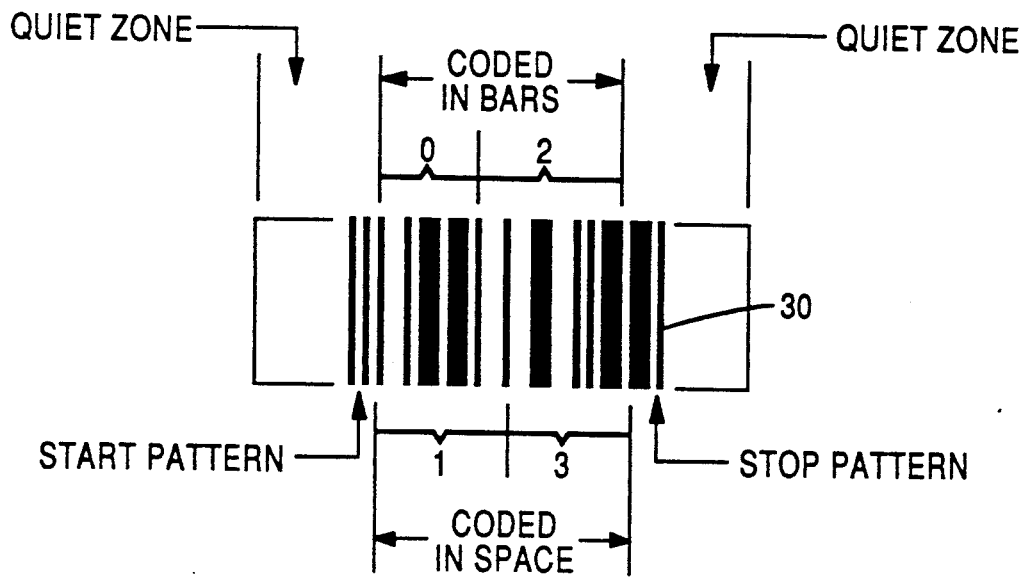
FIG. 10 is a graphical representation of a code 2 of 5 label.

Referring now to FIG. 10, there is shown a graphical representation of a CODE 2 of 5 symbol or coded label 30. The symbol includes a numerical character set and different start and stop patterns. Two pairs of characters are encoded in each symbol. In this symbol two characters are paired together using bars to represent the first character and spaces to represent the second character. For the character set 0 through 9, each character has two wide elements and three narrow elements. The five character elements are represented by bars for the more significant digit of the pair. Each character pair is coded into a series of five bars and five spaces with the bars representing the code for the more significant digit of the pair while the spaces represent the code for the less significant digit. The element pattern for a digit is derived from a weighted position code in which, reading from left to right, the five element positions are weighted according to a 1, 2, 4, 7 and parity value. Except for the zero digit, the sum of the weighted numeric positions yields the value of the coded digit. The parity bit is added when necessary to give all codes exactly two non-zero weights. The associated bar code elements are narrow for zero weights and wide for the unit weights.

Referring now to FIG. 11, there is shown a block diagram of the bar code reading system which is embodied in a IC chip. The data generated by the optical scanner 31 in scanning a bar code label consists of a number of video input signals in which the chip measures the interval of time between consecutive edges of the input signals using a counter output corresponding through changes from light to dark regions over which the laser beam passes. The chip then buffers this data and filters it against programmable criteria before passing it into a FIFO buffer, from which it is presented to a microprocessor 44 upon demand. The chip will filter, frame and ID the data of four major bar code types. These are UPC, 128, 3 of 9 and 2 of 5. The chip also integrates into its logic as many additional functions as possible to reduce to a minimum the circuitry required on the scanner PC board. The most significant logic included is to provide the communication capability with the scanner's terminal host. The chip includes much of the logic that supports five different communication protocols. The five are: OCIA Short Format, OCIA Long Format, IBM 4683, 8-bit Parallel, RS 2-3-2 Wedge.

As is well known in the art, the scan lines 22, 24 (FIGS. 6 and 7) scanning the bar code label will be reflected from the bars and spaces which compose the label back through the optical scanner 31 wherein a photodetector (not shown) converts the reflected light into electrical signals. A video amplifier and latch circuit (not shown) located in the optical scanner 31 generates, in response to the generated electrical signals, the digital signal VIDEO indicating a space-to-bar transition or interval when going high and a bar-to-space transition or interval when going low.

The VIDEO input signals representing the occurrence of an interval appearing on line 32 are inputted into a counter prebuffer and FIFO block 34 (FIG. 11A) which stores the data representing bar and spaces on a bar code label. The block 34 will assemble the interval data to represent the number of intervals in the scanned label and transmit this data over the bus 36 to the UPC filter 38, the 128 filter 40 and the 2 of 5 and 3 of 9 filter 42. The decisions made by the filters 38-42 inclusive includes the generation of start and stop bits defining the location of valid character data in the prebuffer portion of the block 34 and are fed back over bus 43 to the block 34 to be inserted into the data prior to being stored in a FIFO storage unit 80 (FIG. 12D) for retrieval by a microprocessor 44. The microprocessor 44 is coupled over bus 46 to a processor interface unit 48 which transmits all control criteria selection parameters to the blocks 34, and 38-42 inclusive from the microprocessor. The processor interface block 48 outputs am interrupt signal over line 29 to the microprocessor 44 indicating that there is data stored in the FIFO storage unit ready to be transferred to the microprocessor. The block 48 is also coupled over bus 50 to the counter prebuffer FIFO block 34 and over bus 51 to a communication interface block 54 in which are located five different communication protocols. The communication interface block 54 is coupled over bus 56 to the processor interface block 48 enabling the microprocessor to transmit data to a host terminal remotely located from the chip.

Referring now to FIG. 11A and FIGS. 12A-D inclusive, there is shown a detailed block diagram of the counter, prebuffer and FIFO control block 34. Included in the block is a crystal (not shown), which provides all the clocks used by the VSLI chip, and which can be any value from 20 MHz to 48 MHz. One OSC cell is provided. It is designed to operate at 20 MHz to 30 MHz, with a fundamental crystal and no external circuitry, and from 30 MHz to 48 MHz, with a third overtone crystal and an external tank circuit. It can also be driven by an external clock generator chip. The actual crystal chosen is dependent upon the specific scanner in which the chip will be used. Such factors as laser beam speed and the resolution of the analog video circuit preceding this chip, determine the practical value of the crystal that should be used.

The clock signals appearing on line 60 will be transmitted through the divide-by-two circuit 64 which is operated by the signal SET VID COUNT/2 appearing on line 62 to output the clock signals to an interval counter 66. The counter is controlled by the transitions in the level of the VIDEO signal appearing on line 32, at which time, the counter begins counting at hex number 2. The rate at which it counts is programmable to be the rate of the primary clock appearing on line 60, or the rate of the primary clock/2 outputted by the circuit 64 when operated. The counter has a "halo" period of six counts. If another video transition occurs within six counts of a previous transition, the counter ignores the first transition. If a transition occurs between the seventh and fourteenth counts of a previous transition, the counter will delay action until the count is 14 and then proceed as though the transition had occurred at that point. When a count of between 14 and 7ffh is in the counter and a video transition occurs, the counter will reset to hex number 2 and begin its halo period. During this time, it will generate an INT CLK signal over line 68 and load the count (bits 0-10) over line 70, as well as the state of the video bit (bit 11) over line 72 into a serial prebuffer register unit 74 (FIG. 12C) which includes a shift register portion 75 and a ram prebuffer portion 78 indicating whether the interval count is a bar or space. Thus, the prebuffer unit 74 will contain a string of interval counts, identified as being tag bars or tag spaces, which describe the relational width of the bars or spaces on a tag or bar code label. If video transitions stop occurring, as will happen during portions of the laser beam sweep, the counter will reach count 7ffh. At this point, the counter will enter a phantom mode operation. The counter will generate INT CLK signals over line 68 which is transmitted through the OR gate 76 (FIG. 12C) to the RAM prebuffer portion 78 of the unit 74, storing the count 7ffh into the register portion 75, and generating a new INT CLK signal every 14 counts, storing additional 7ffh counts, until a video transition occurs. If the transition occurs when the phantom count is between 0 and 14, the counter will delay until 14, at which time it will generate an INT CLK signal and store the last 7ffh count. The purpose of generating these phantom INT CLK signals is to flush any possible good data sitting in the prebuffer portion 78 ahead of the data clocked in by the 7ffh counts into the FIFO RAM storage unit 80 (FIG. 12D), where the microprocessor 44 (FIG. 11) can get it and analyze it immediately.

The data stored in the prebuffer portion 78 is transmitted over a fifteen bit bus 82 to the FIFO storage unit 80 (FIG. 12D) under the control of FIFO clock signals appearing on line 84 in a manner that will now be described. The present invention filters interval data captured in the prebuffer portion 78, by ascribing to the theorem, stating that the sums of the intervals of adjacent framed tag characters in a good tag, will generate frame sums that are within a specified percent of one another, while the sums of intervals that are not framed tag characters will generate frame sums that are not within a certain percent of one another.

In the case of UPC and CODE 128 tags, this is the prime technique used to choose between data that is good tag data, and data that is not. The code 2 of 5 and code 3 of 9 tags are analyzed using a different theorem. To implement the above, it is necessary to add adjacent intervals through a series of serial interval adders. The adders provide the logic with new two adjacent interval sums, four adjacent interval sums, six adjacent interval sums, and ten adjacent interval sums, at every interval count. These term sums are delayed by four and six interval clocks, and fed to comparators at the same time new 4 and 6 term sums are arriving at the comparators. Additional adders have taken a percentage of the value of the delayed 6 and 4 term sums, as well as a percentage of the new 6 and 4 term sums. Two character compare equality is then determined by taking the percentage sum of the delayed 6 or 4 term sums and sum is greater, we are half way to an equality. At the same time, the percentage sum of the new 6 or 4 term sums are compared to the old 6 or 4 term sum. If the old sum is greater, we have proved the first 6 or 4 intervals, and vice versa. Since CODE 128 characters are defined to have 6 intervals in them, and UPC characters are defined to have 4 intervals in them, we have a good possibility that the two characters, framed by this INT CLK, are two good tag characters.

Depending upon whether the two character compare equal comes from the 4 term sum character compare or the 6 term sum character compare, we say that there are two good UPC characters, or two good 128 characters, respectively. The UPC 2 EQU CHAR term and the 128 2 EQU CHAR term are sent to the UPC and 128 filter logic, respectively, to initiate action therein. The ten term sum is sent to the 2 of 5 and 3 of 9 logic for also processing therein.

There are four remaining bits in the prebuffer, bits 12, 13, 14 and 15. These bits are defined to be UPC "start", 128, 2 of 5 and of 3 of 9 "start and stop", and UPC "stop" bits, or "tag" bits, in that order. These bits are always being loaded a "0" at the beginning of the prebuffer unit 74, thus these bit positions, if left alone, would always be all "0's" in the prebuffer unit. The UPC, 128, 3 of 9 and 2 of 5 filter logic, however, does not leave them alone. These filters control insertion bits in the prebuffer unit, and can turn one of these bits on any time they deem necessary. When the filter logic is selected and the criteria are selected for the filters by the microprocessor, the filters will insert bits into the appropriate tag bits in the prebuffer unit at certain INT CLK times as described above. The specific locations and times are determined by the analysis the filter logic performs on the 2 EQU CHAR terms, in the case of the UPC and 128 filters, and by the first 11 intervals in the prebuffer unit, and the 10 term sum, in the case of the 2 of 5 and 3 of 9 filter. With the exception of the UPC tag bits, the leading bit in the prebuffer unit, for a particular tag, will normally be detected as a "start bit", while a following bit, of the same tag type, will be detected as a "stop bit." These bits are moved through the prebuffer unit by the INT CLK signals. At some point in time, these bits reach the end of the prebuffer unit and are fed into logic that, in conjunction with frame terms generated by the filter logic, will toggle one of a group of FIFO ENABLE flip-flops 108 (FIG. 12C) as will be described more fully hereinafter.

Once any of these flip-flops are on, a FIFO ENABLE signal will be active, which will allow the current word of interval data to be written into the FIFO. As long as any one of these flip-flops remains on, all subsequent data coming out of the prebuffer unit will also be written into the FIFO storage unit. The next bit (stop bit) to come along in this tag type will toggle the flip-flop off. If this flip-flop was the only one of the group to be actively holding FIFO ENABLE on, it will now go false. The current word of interval data in the prebuffer unit 74 will be written to the FIFO unit 80, and then no further data from the prebuffer unit will be transferred into the FIFO unit until another start bit comes out of the prebuffer unit, in one of the tag type bit streams. Thus, only data that meets the criteria programmed into the filter logic is allowed to enter the FIFO unit; all other data is discarded at the end of the prebuffer unit operation.

The interval counter 66 (FIG. 12A) will output over line 86, when in a phantom mode, a signal to one input of an AND gate 88 whose output signal over line 89 is transmitted to one input of an AND gate 90 which also receives over line 92 clock pulses from the divide-by-twenty circuit 94 which has divided the primary clock signal by twenty. The output clock signals of the AND gate 90 are transmitted over line 96 to one input of the OR gate 98 which also receives the INT CLK signals over line 68. The clock signals outputted by the AND gate 90 are also transmitted over line 100 to the OR gate 76 (FIG. 12C) enabling the prebuffer portion 78 to be clocked for loading the interval data bits through the prebuffer portion.

Figure 11A:
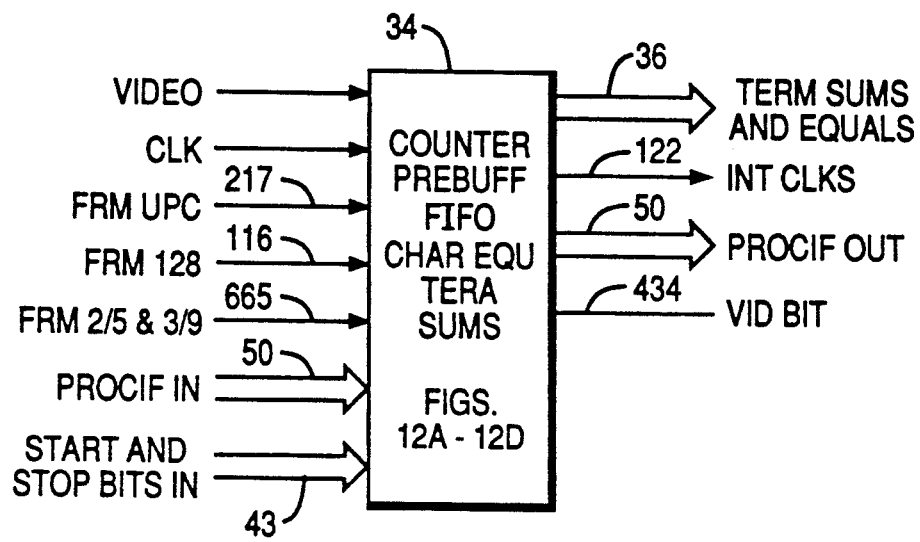
FIGS. 11A-11F inclusive illustrate the signals associated with the control blocks of the bar code reading system of FIG. 11.
Figure 11B:
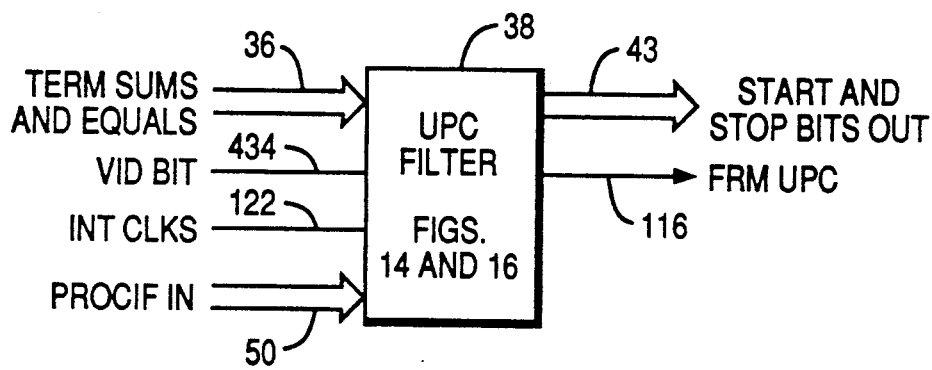
Figure 11C:
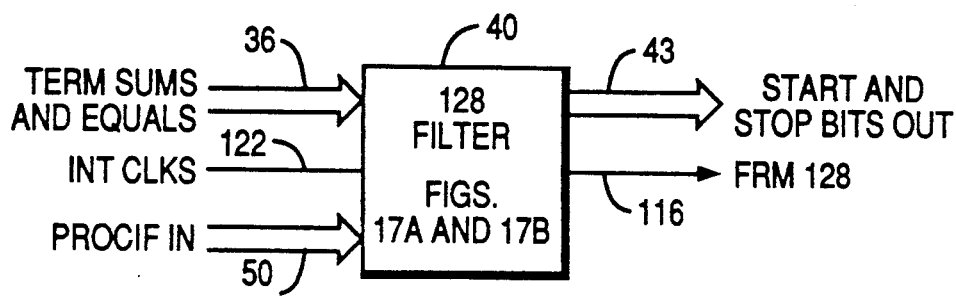
Figure 11D:
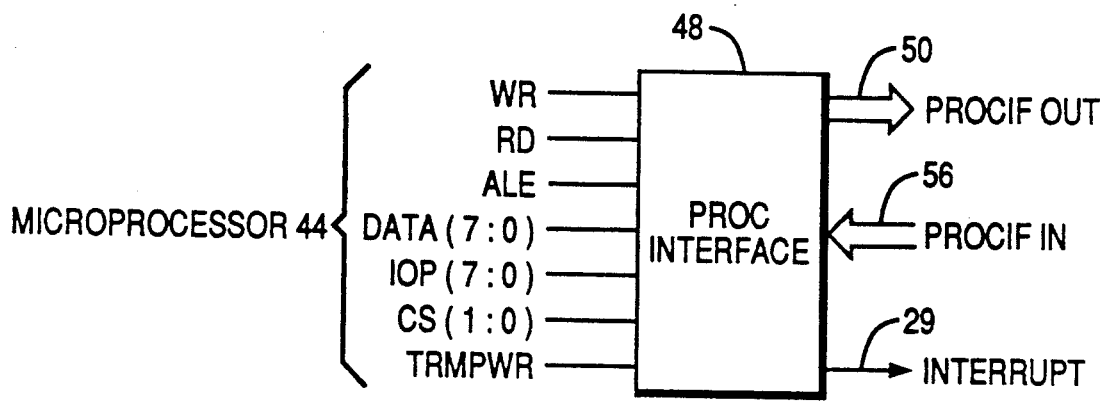
Figure 11E:
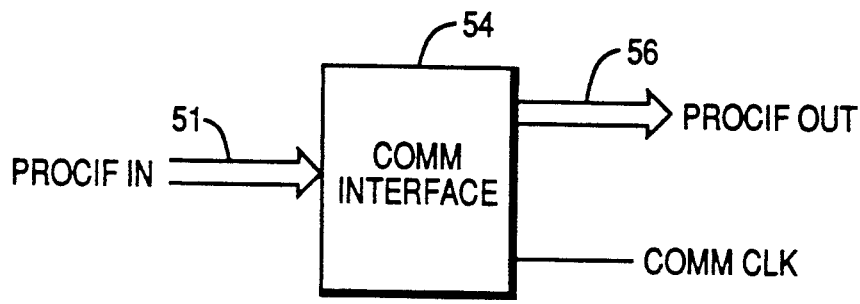
Figure 11F:
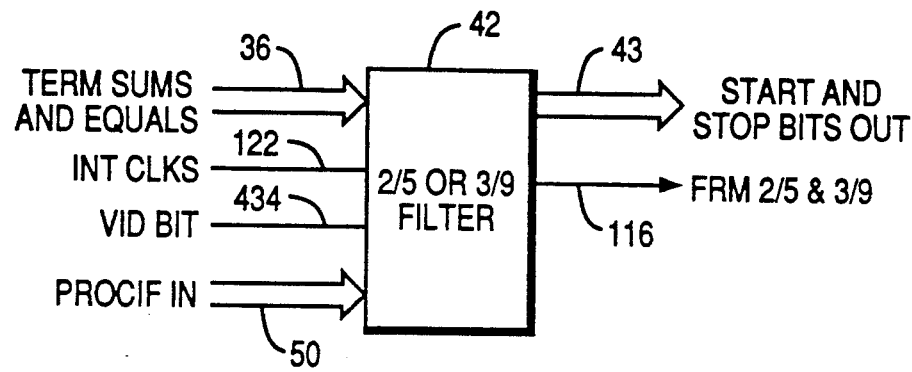
Figure 12A:
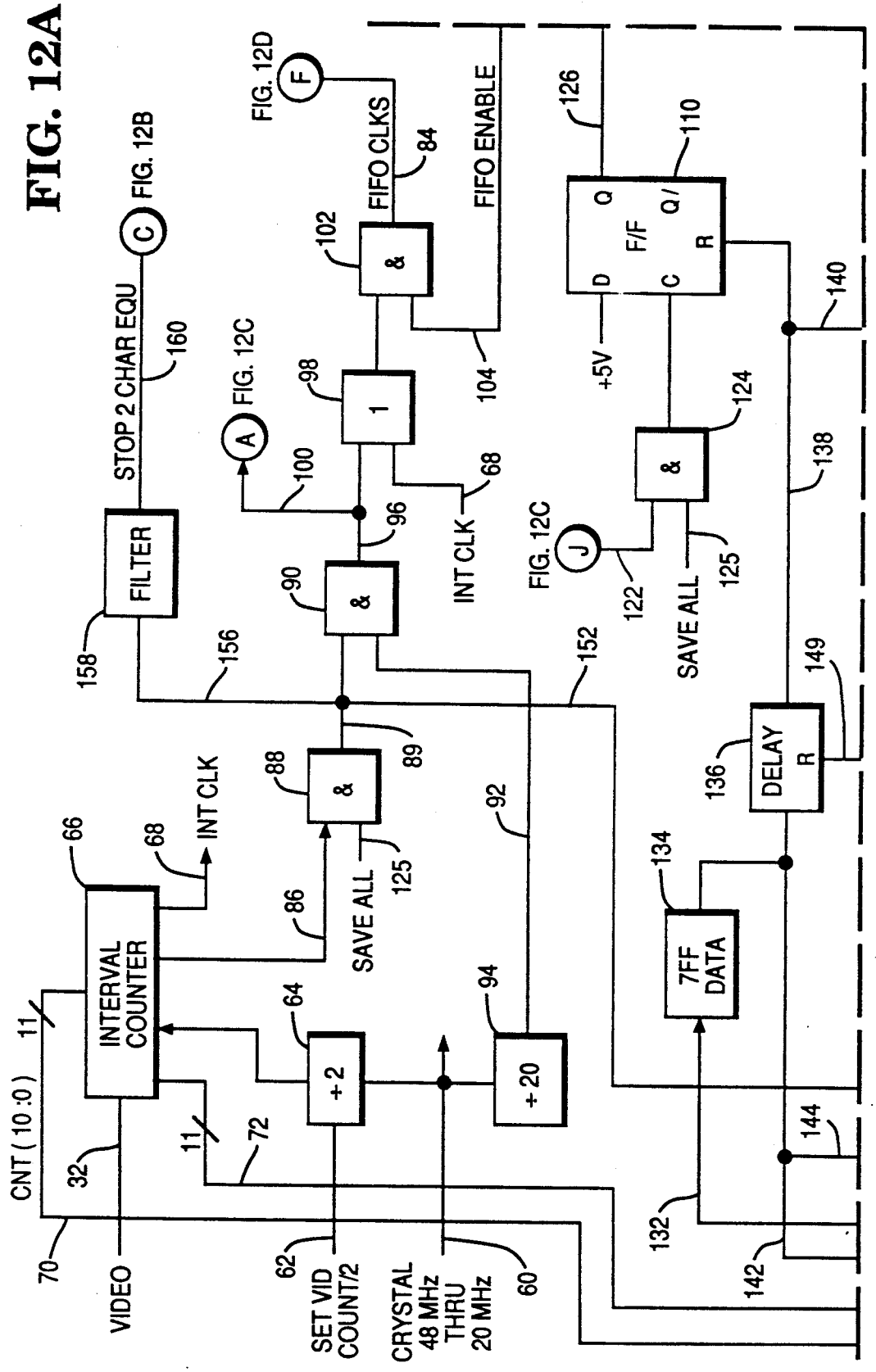
Figure 12B:
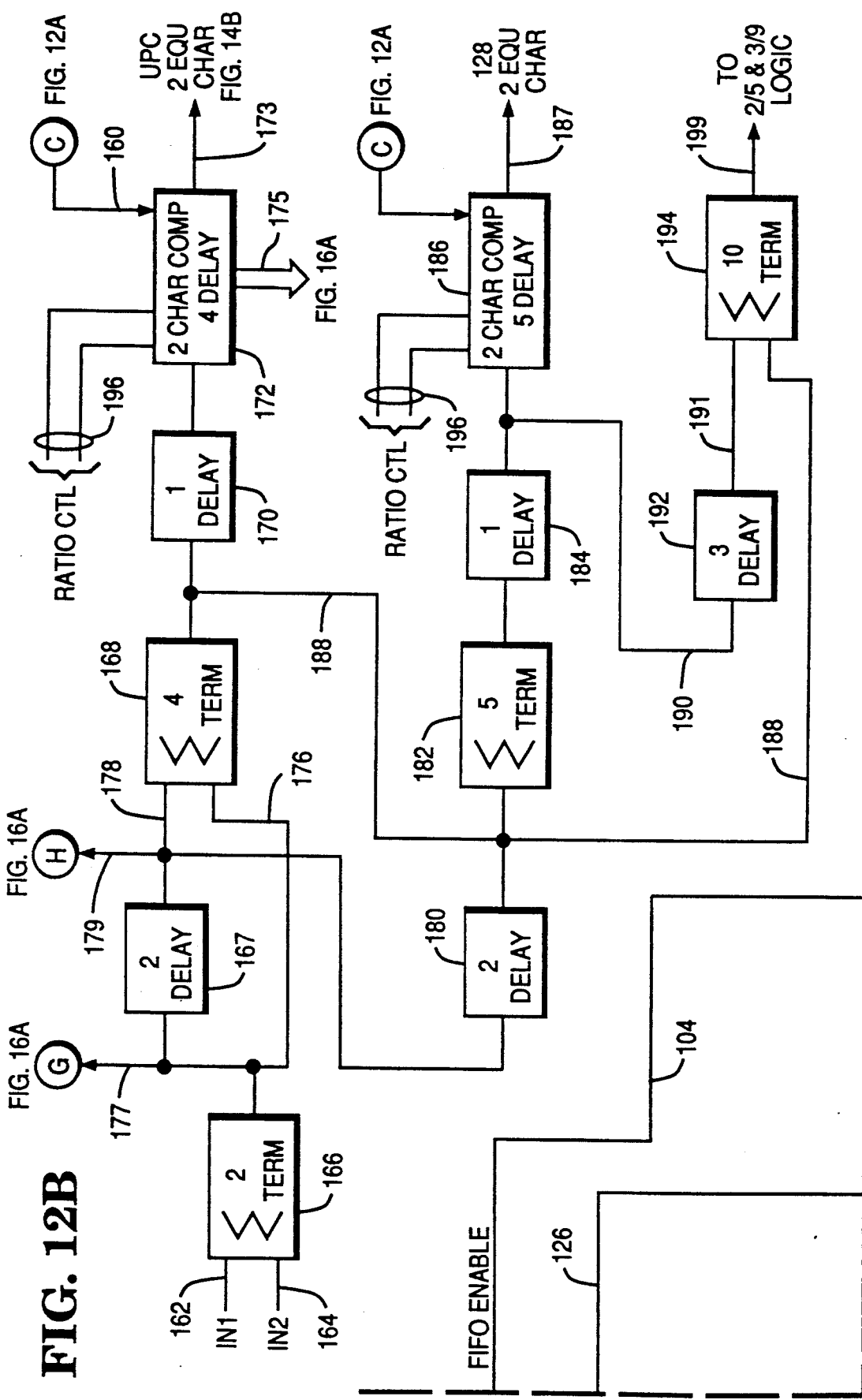
Figure 12C:
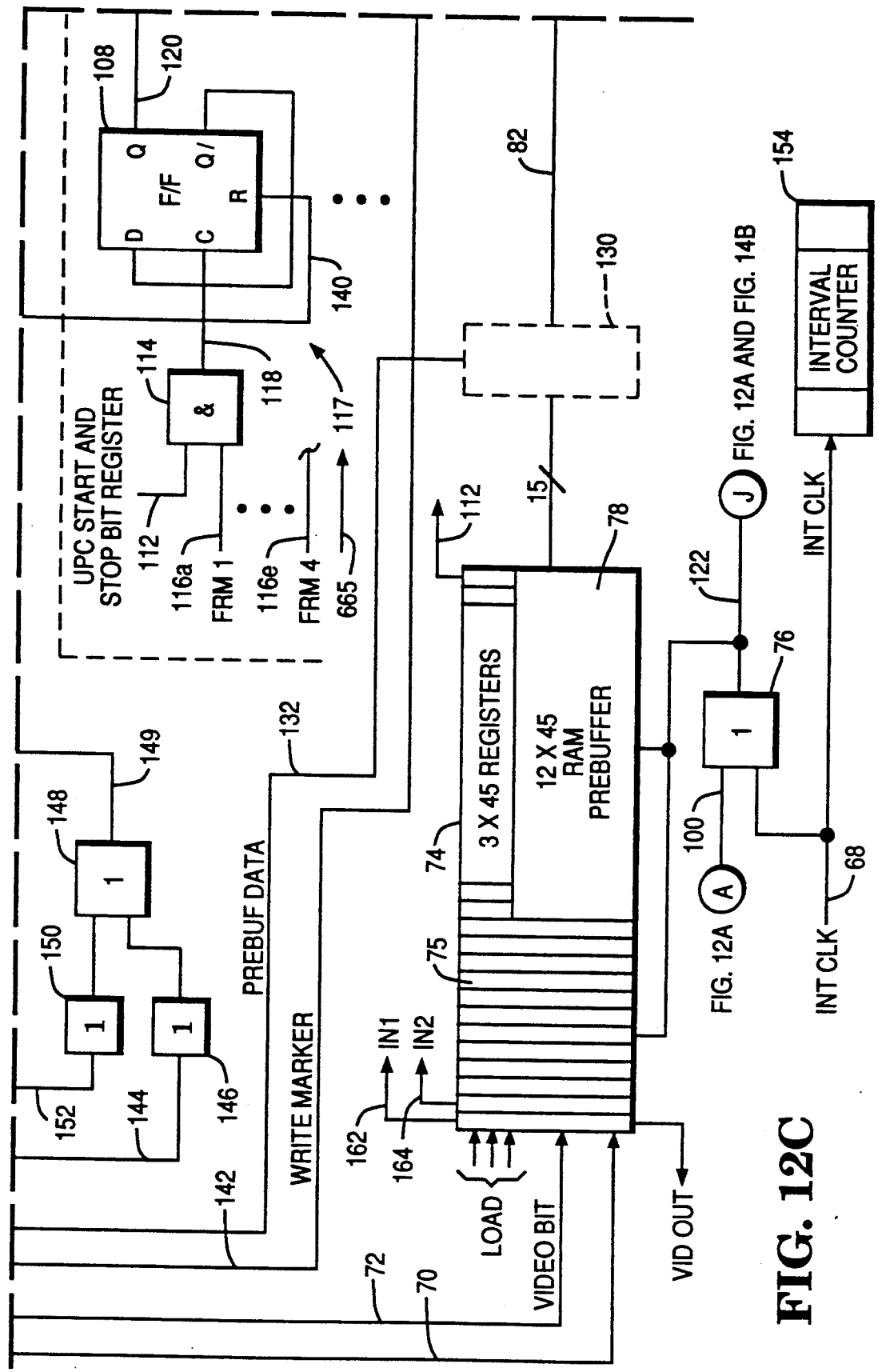

The clock signals outputted by the OR gate 98 are transmitted to one input of an AND gate 102 whose output FIFO CLKS signals are transmitted over line 84 to clock the interval data bits stored in the buffer portion 78 into the FIFO storage unit 80 (FIG. 12D). The AND gate 102 is enabled by a FIFO ENABLE signal appearing on line 104 and which is outputted from the OR gate 106 (FIG. 12D). The OR gate 106 receives output signals from twenty FIFO ENABLE flip-flops 108 coupled to the filters circuits 38-42 inclusive (FIG. 11) one of which is shown in FIG. 12C and the flip-flop 110 (FIG. 12A). Whenever a start bit or stop bit appears in the registers 12-15 inclusive of the register portion 75 of the prebuffer unit 74 for each type of tag, a high signal will appear on line 112 which is inputted into one input of the AND gate 114 which also receives a frame bit over line 116 from one of the filter circuits 38-42 inclusive (FIG. 11) in a manner to be described more fully hereinafter.

In the UPC filter circuit 38 (FIG. 11B), there is a separate bit stream for start bits, and a separate stream for stop bits. The framing logic shown is the same for the other tag types, thus there are four FIFO ENABLE circuits generally indicated by the numeral 117 (FIG. 12C) consisting of the AND gate 114 and the flip-flop 108 in the UPC case. Each of these circuits, instead of being simple toggle flip-flops, are two bit up-down counters. Start bits coming from the UPC start tag bit stream and appearing on line 112 will increment one of the frame counters 220 (FIG. 14B) while stop bits coming from the UPC stop tag bit stream will decrement the counter When all the counters are at "0", the UPC FIFO ENABLE goes inactive. If a start bit and stop bit occur at the same time, the counter will remain unchanged. If a counter is at "0", and a stop bit occurs, it will remain at "0". The UPC logic implementation allows it to handle the unique conditions associated with UPC tags, in which additional start bits can be inserted ahead of stop bits in the interval stream. These unique conditions can occur because of: (1) The UPC periodical mode, and (2) The center band unique to UPC. The FIFO storage unit 80 is simply a place to store "good" tag interval data, along with that data's associated video bit and start and stop tag bits. It buffers this data until the microprocessor 44 can read the data out, and perform character decode and other associated processing on it.

Since there can be four frames in every UPC character, the first frame might be the true character, or the second etc., it is never clear where the real tag data is going to start. When a start bit or stop bit was placed in the prebuffer unit 74, it was specifically inserted at a position corresponding to the start of the first interval of the next frame to mark a frame for that particular string of data. The whole string of data is broken up into blocks of four characters and every one starts out with the same frame with each succeeding start bit and stop bit associated with the same frame. When a start bit appears on line 112 (FIG. 12C) and a frame bit appears on line 116, the AND gate 114 will output a high clock signal over line 120 to the OR gate 106 (FIG. 12D) which outputs the FIFO ENABLE signal over line 104 enabling the AND gate 102 (FIG. 12A) to clock the FIFO storage unit 80 to store the interval data appearing on bus 82. When a stop bit appears on line 112, the flip-flop 108 will remove its enable signal from the OR gate 106. Only after the last frame of data has seen its stop bit will the OR gate 106 be completely disabled thereby disabling the AND gate 102. The flip-flop 110 (FIG. 12A) is enabled by the signal appearing on the output line 68 of the interval counter 66 and transmitted through the OR gate 76 (FIG. 12C) and over line 122 to the AND gate 124 which clocks the flip-flop 110 thereby outputting a high signal over line 126 to the OR gate 106 which outputs the FIFO ENABLE signal over line 104. The FIFO ENABLE signal is transmitted to the AND gate 102 (FIG. 12A) which outputs the clock signal FIFO CLKS to the FIFO storage unit 80 clocking the data from the prebuffer unit 74 into the storage. Each time the output signal appearing on line 68 of the counter 66 (FIG.12A) goes low, the enable signal appearing on line 126 will be removed.

A logic circuit 130 (FIG. 12C) including an inverting circuit (not shown) is inserted in the bus 82 between the prebuffer unit 74 and the FIFO storage unit 80 that allows modification of the data that is passed to the storage unit from the prebuffer unit. Whenever there is a last stop bit detected in a string of data coming out of the prebuffer unit, the character that is then being written into the storage unit 80 on the next interval clock will have a stop bit placed in the proper position but all of the other data positions of the character will be changed to zero. This condition will notify the microprocessor 44 that this character was the end of a string of data and that the data that follows represents a break in the real time data.

At certain times during the scanning sweep of the laser beam, the interval counter 66 (Fig. 12A) will overflow and enter a phantom mode. When this happens, 7ffh counts are inputted into the prebuffer unit 74. This allows any good data ahead of the data stored by the 7ffh counts to be processed by the filter logic and "tagged" as such, if necessary. However, the filter logic would start to process the 7ffh data as new tag data, after four intervals of data from the prebuffer unit had been processed. This is undesirable, as this data will look equal to the 2 char compare logic. Therefore, four intervals after the counter phantom mode starts, all character compare logic is shut down. All good data ahead of the 7ffh data, however, is put in the FIFO unit. At some point in time, the 7ffh data will start to exit the prebuffer unit. Normally, the FIFO ENABLE flip-flops 108 would be off at this time. If, however, an anomaly should have occurred, a detect circuit will allow only 45 continuous 7ffh counts to be placed in the FIFO unit before a total reset and resynchronization of the FIFO ENABLE flip-flops will occur. The 45 clock delay signals are required because, in certain instances, good data in the prebuffer portion 78 could be framed by the 7ffh data streams, and would be lost if not allowed to advance to the end of the prebuffer portion before being reset. The reset operation will be killed anytime the counter exits the phantom mode, or non-7ffh intervals reach the end of the prebuffer unit.

When certain conditions occur, 7ffh markers are written into the FIFO. These markers, which will be read by the microprocessor 44, will be used by the microprocessor to aid it in analyzing the data stream it is presented with. The three major conditions are as follows:

(1) When a 7ffh interval, or the first of a stream of 7ffh intervals, is detected at the end of the prebuffer unit 74, a 7ffh bit is written in the interval portion of the word, and it, alone, is written into the FIFO storage unit. This indicates to the microprocessor that the counter overflowed at least once, at this point in time, in the data stream.

(2) Whenever the FIFO ENABLE goes inactive, a "0" is written into the interval portion of the word at the end of the prebuffer, and it is written into the FIFO storage unit. This indicates to the microprocessor that there was a break in real time, at this point in the data stream.

(3) Whenever the FIFO unit is one location away from being full, a "0" is written into the interval portion of the word at the end of the prebuffer unit, and it is written into the FIFO storage unit. This, as above, indicates to the microprocessor that there was likely a break in real time, at this point in the data stream.

One final feature exists in this logic. This feature is the "save all" mode. The microprocessor 44 can select a save all mode, and when activated, will enable the FIFO storage unit 80 continuously by outputting the signal SAVE ALL on line 125 into the AND gates 88 and 124 (FIG. 12A) which allows continuous FIFO CLKS signals to be generated for clocking the storage unit 80 to store all the data from the prebuffer unit 74 so that all data entered into the prebuffer unit 74 will eventually be shipped into the FIFO storage unit, and on to the microprocessor 44. The phantom mode of the counter, however, is disabled so that scores of artificially generated INT CLK's do not flood the FIFO unit with 77ffh counts. All data clocked by real INT CLK's will, however, go to the microprocessor. This mode allows the system to pass data from non-supported tag types on for microprocessor analysis and possible decode.

As shown in FIG. 12C, appearing on line 132 is the signal PREBUF DATA which also appears on the bus 82 and is outputted from the logic circuit 130. This data is transmitted to a 7FF filter 134 which will output a signal to a delay circuit 136 upon detecting 7FF counts which occur in an overflow condition of the prebuffer unit 74. In order to resynchronize the data coming through the prebuffer unit 74 when the counter 66 (FIG. 12A) goes into a phantom mode and outputs a plurality of 7ff counts, the delay circuit 136 will output a high signal over line 138, resetting the flip-flop circuits 108, 110 disabling the FIFO storage unit 80 from accepting data from the prebuffer unit 74. The output signal of the 7ff filter circuit 134 is also transmitted over line 142 as the WRITE MARKER signal over line 142 to the FIFO storage unit 80 resulting in 7ffh markers being written in the data that is stored in the FIFO unit 80 as previously described. When this signal is not present, the low signal appearing on line 142 is transmitted over line 144 through the inverter circuit 146 and through the OR circuit 148 to reset the delay circuit 136 over line 149. The circuit 136 is also reset when it receives a signal from the AND gate 88 (FIG. 12A) when the counter 66 goes into a phantom mode. This signal is transmitted over line 152 through inverter 150 (FIG. 12C) to the OR gate 148.

Figure 16A:
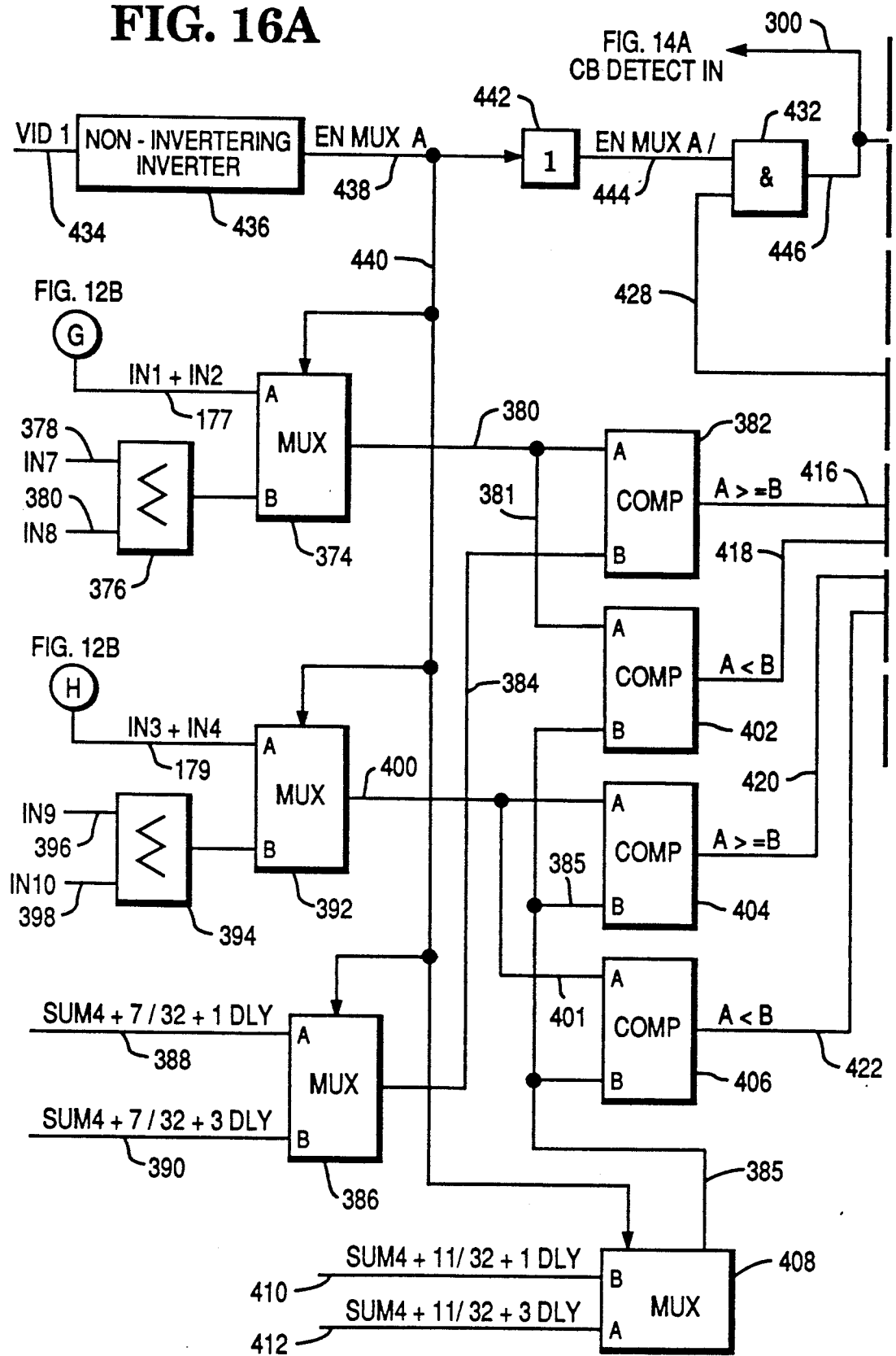
FIGS. 16A and 16B taken together form a detailed block diagram of the code UPC EAN8 filter of FIGS. 11 and 11C.

The first two shift registers of the register portion 75 of the prebuffer unit 74 (FIG. 12C) will output the interval signals IN1 and IN2 over lines 162 and 164 respectively. These signals are inputted into a 2 term adder 166 (FIG. 12B) which is part of the logic that generates the term sums representing two equal characters that are used by the filter circuits 38 and 40 (FIG. 11) and a ten term sum which is sent to the filter circuit 42 to detect the type of coded tag that is being scanned. The output of the adder 166 is inputted into a two interval delay circuit 167. The output of the delay circuit 167 is transmitted to a 4 term adder 168 over 178 which adds the delay term to the original term appearing on line 176 from the adder 166 to output a 4 term sum over line 188. This sum is transmitted through a one interval delay circuit 170 to a 2 character comparator and 4 interval delay circuit 172 which compares the first two characters to see if they are equal which are required for use in the decoding of a UPC coded tag. If they are equal, the high UPC 2 EQU CHAR signal will be outputted over line 173 to the UPC filter circuit 38 (FIGS. 11 and 14B). The microprocessor 44 applies the ratios 7/16 and 11/32 over line 196 to the circuit 192 to output the terms SUM4+7/32+1 and 3 DEL and SUM4+11/32+1 and 3 DEL over the bus 175 for use in decoding the UPC EAN8 tag (FIG. 16A).

The two term sum appearing on line 178 will be transmitted through a 2 interval delay circuit 180 to a 5 term adder 182 which has received the 4 term sum over line 188. The output of adder 182 is transmitted through a 1 interval delay circuit 184 to a 2 character comparator and 5 delay circuit 186 which outputs the high 128 2 EQU CHAR signal over line 187 to the 128 filter circuit 40 (FIG. 11) if the two characters are found to be equal. The 5 term sum appearing on the output of the delay circuit 184 is transmitted over line 190 through a 3 interval delay circuit 192 to a 10 term adder 194 whose ten term sum output is transmitted over line 199 to the 2 of 5 and 3 of 9 filters 42 (FIG. 11). Also appearing on lines 196 are control signals transmitted from the microprocessor 44 to control the comparators in circuits 172 and 186 to compare for a width of 27/32, 28/32 or 26/32 of the first character to the second character.

Figure 14A:
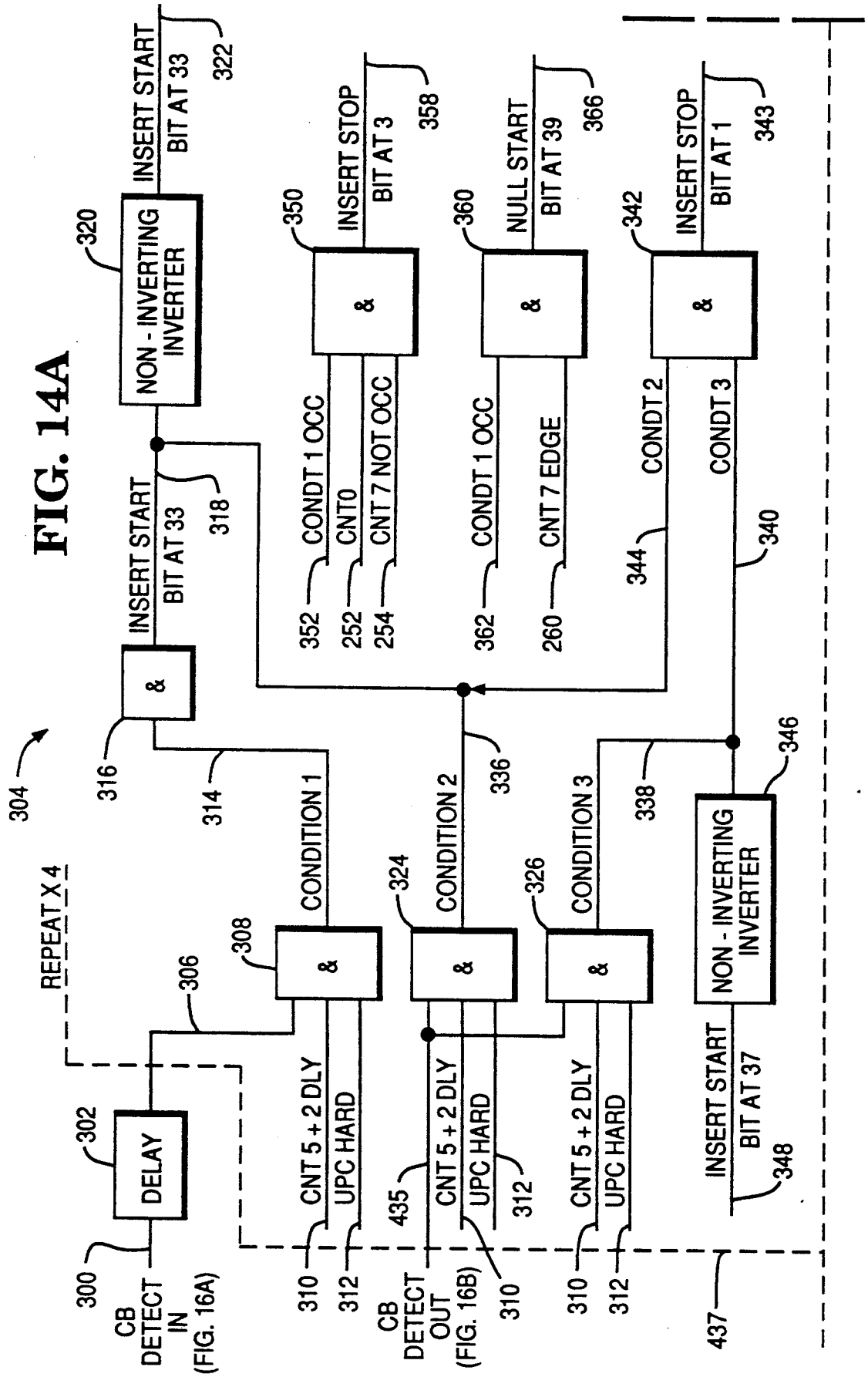
FIG. 14A-14D inclusive taken together form a detailed block diagram of the UPC filter of FIGS. 11 and 11B.
Figure 14B:
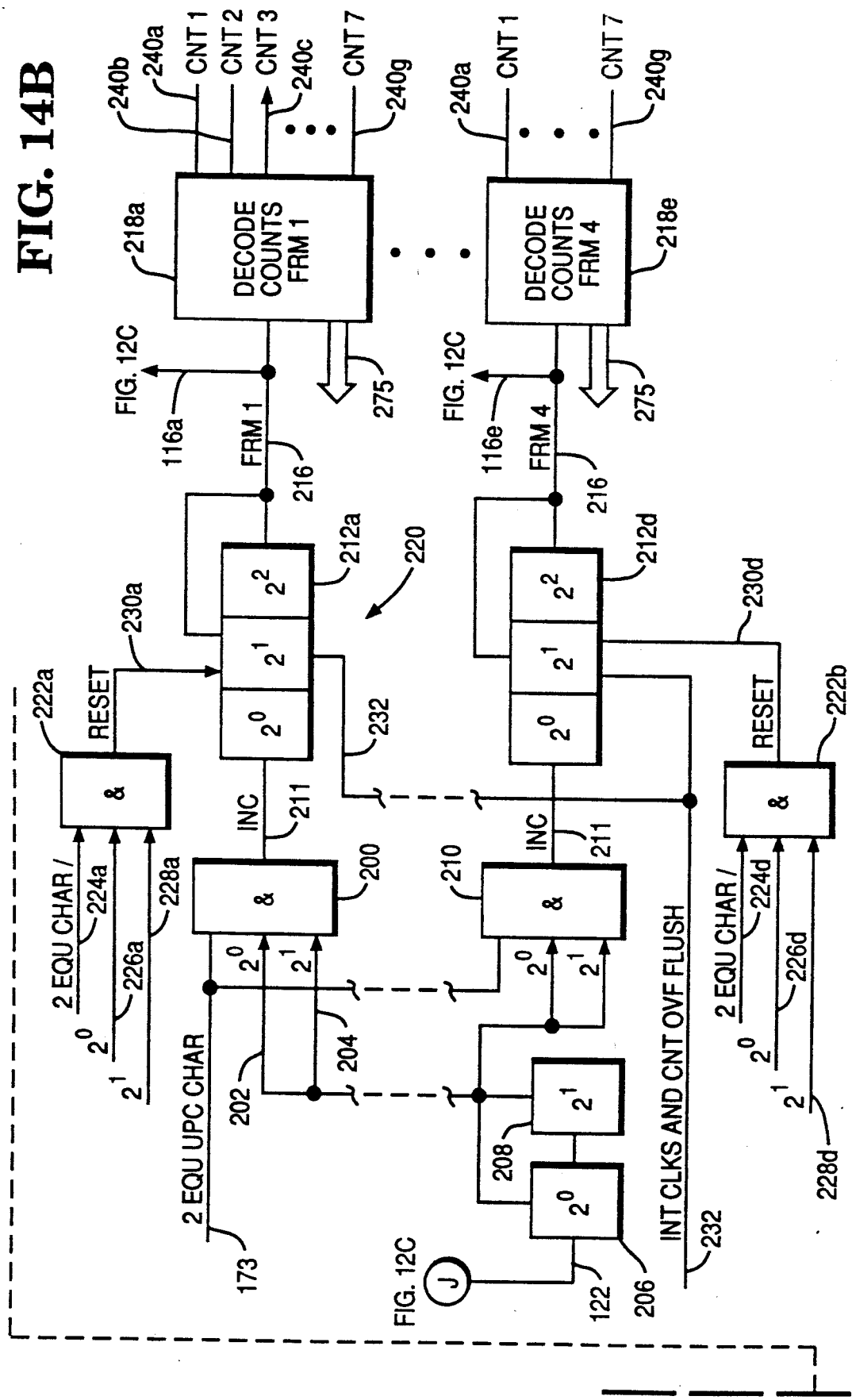
Figures 14C, 15:
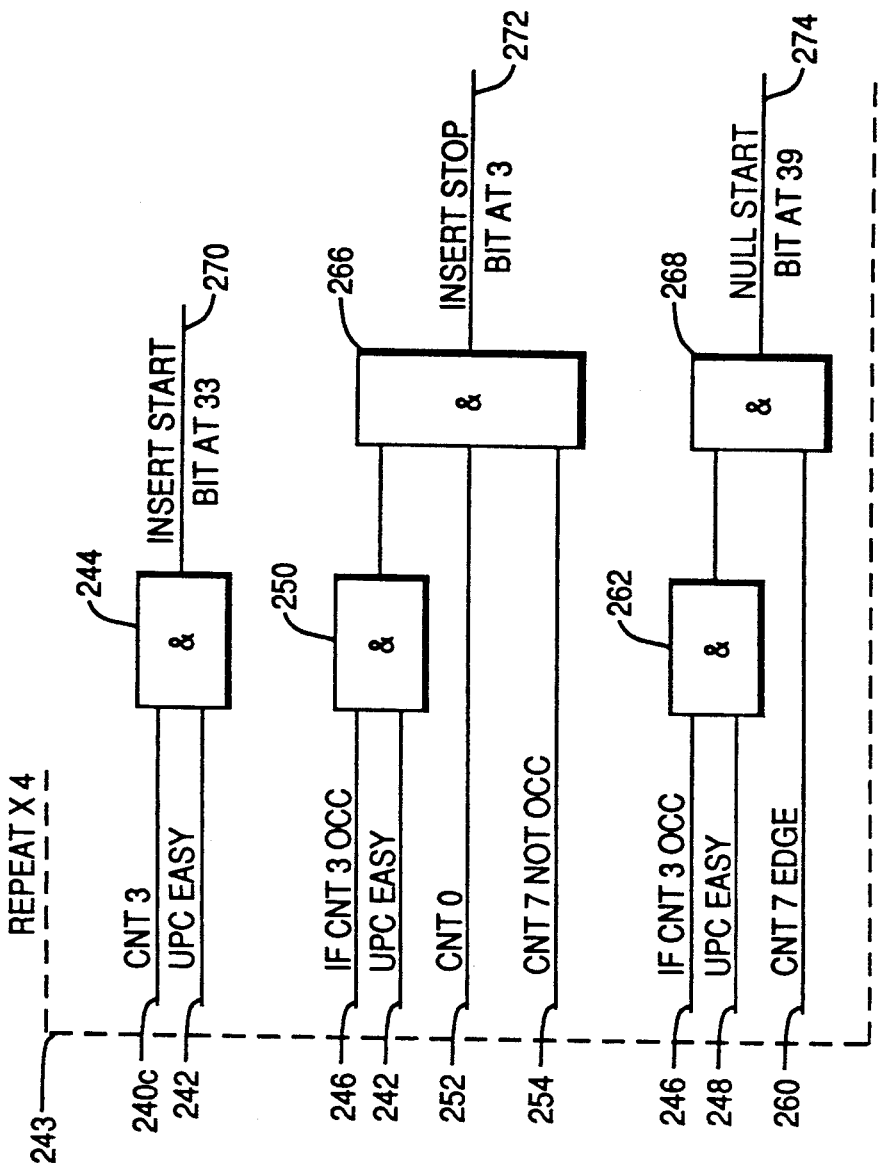
FIG. 15 is a diagram of how FIGS. 14A-14D inclusive are assembled.
Figure 14D:
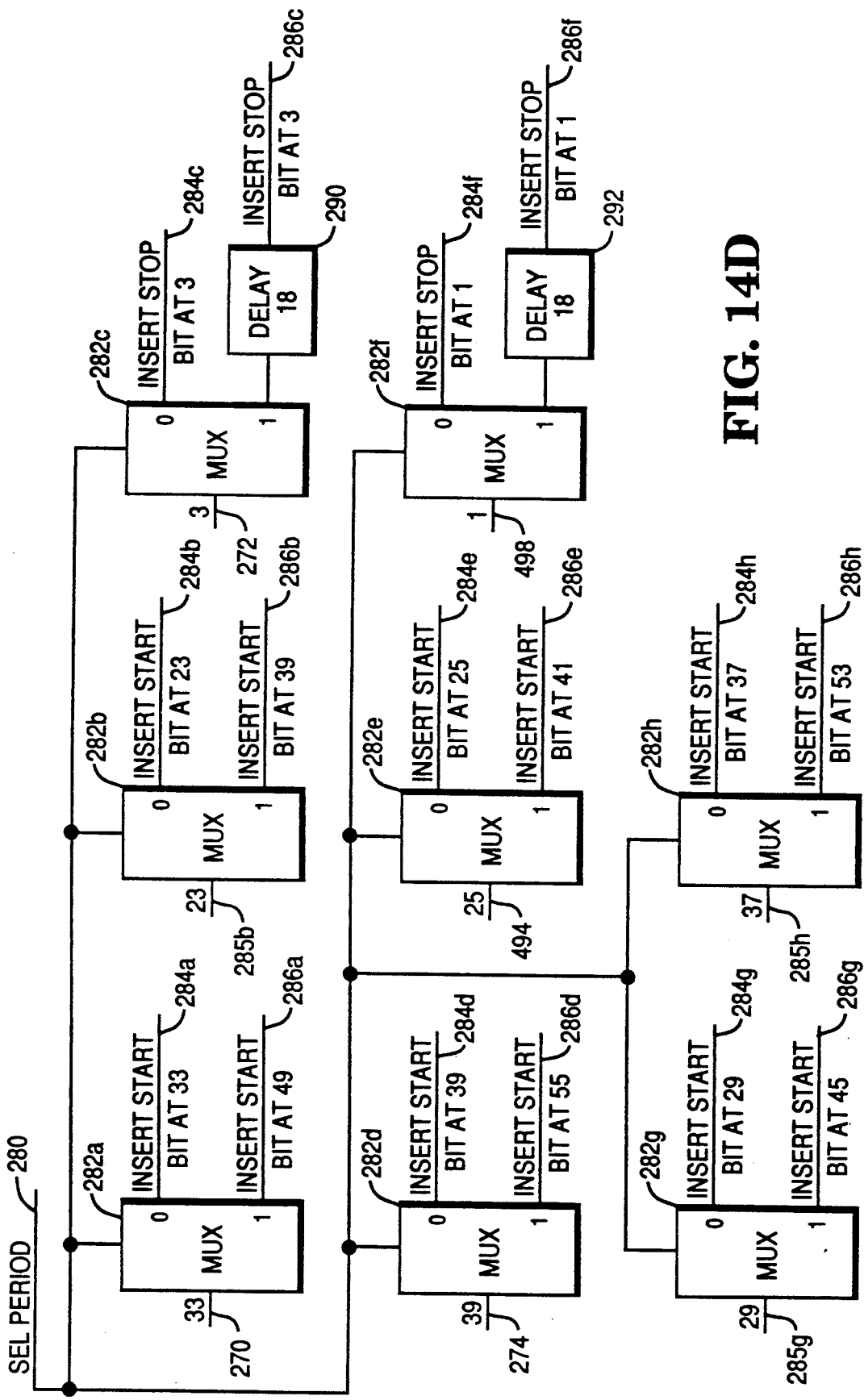
Figure 16B:
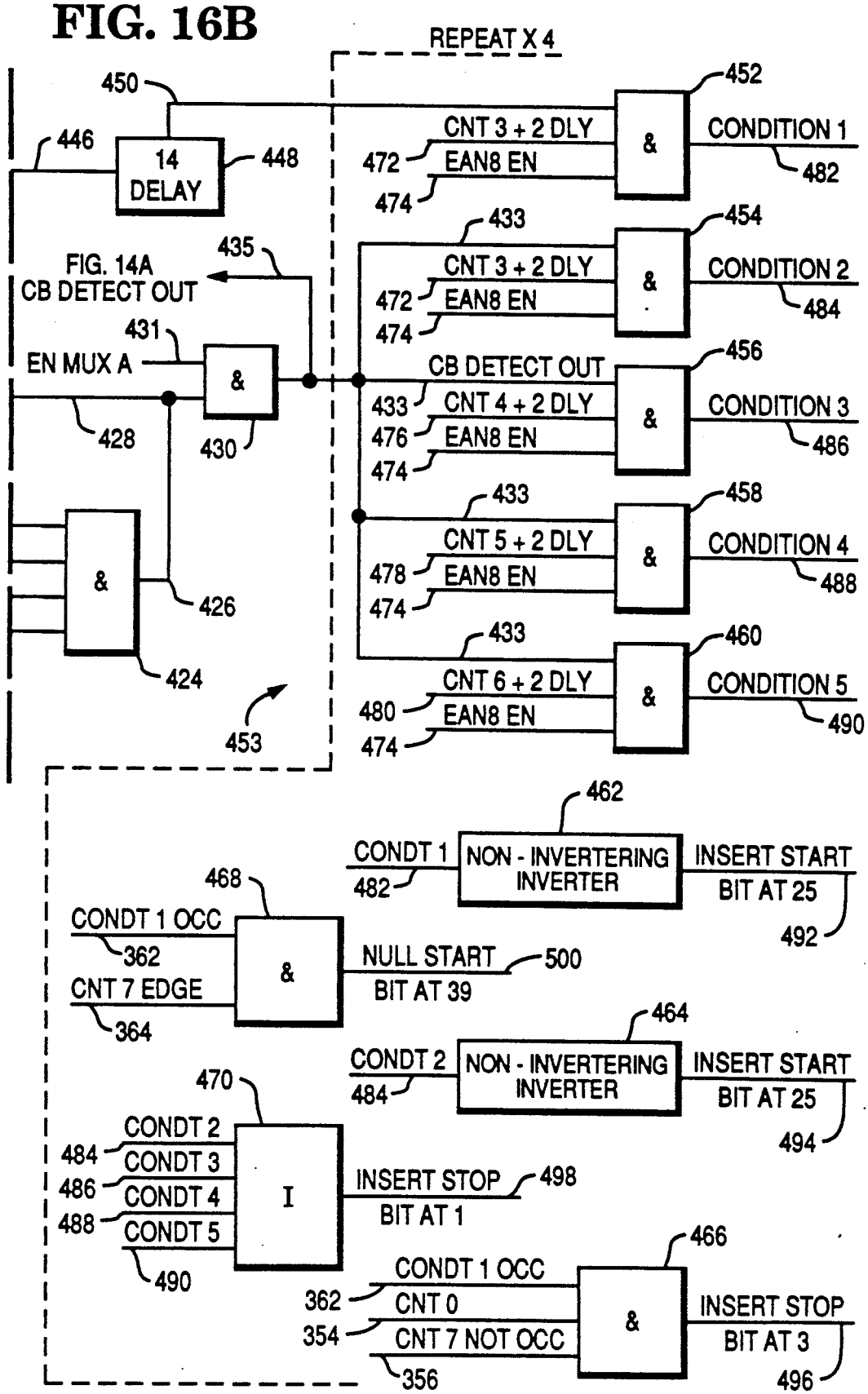

Referring now to FIGS. 11B and 14A-14D inclusive, there is shown a detailed block diagram of the UPC filter 38 (FIG. 11) which processes UPC hard tags (FIGS. 14A and 14B), UPC easy tags (FIG. 14C) and periodical tags (FIG. 14D). A hard tag is characterized as requiring more equal characters before inserting a start bit than for an easy tag. In the UPC easy tag, four sequential equal characters are required as compared to six for the hard UPC tag. Also included in the filter 38 (FIG. 11) is the logic for detecting UPC EAN8 tags (FIGS. 16A and 16B). The UPC tag 20 (FIG. 1) is defined as having four intervals per tag character. Therefore, the previous 4 term sum, the new 4 term sum, 27/32 of the previous 4 term sum, and 27/32 of the new 4 term sum are used in the logic circuits in FIG. 12B to generate UPC 2 EQU CHAR terms at each interval clock, if the compare conditions are met. A UPC 2 EQU CHAR term which appears on line 173 of the comparator circuit 172 (FIG. 12B) is generated if the new 4 term sum is greater than or equal to 27/32 of the previous 4 term sum and the previous 4 term sum is greater than or equal to 27/32 of the new 4 term sum. Note that the 27/32 can be adjusted up or down by the microprocessor. As will be disclosed hereinafter, a frame counter, clocked by INT CLK's is continually counting from 0 thru 3, and over again. The four decoded states of this counter provide the UPC frame count terms. These terms delineate the beginning of one of four possible good tag characters every four intervals. Each of these terms select one of four UPC equal character counters. These counters will increment each time they are selected by their frame term and a UPC 2 EQU CHAR term. This allows these counters to track how many equal characters, in a row, are detected in a specific character frame. The counters will reset any time a 2 CHAR UNEQUAL signal occurs in their frame. This provides the means to detect and count good tag characters that are in sequence in an interval stream.

As shown in FIG. 14B, the UPC 2 EQUAL CHAR signal appearing on line 173 is inputted into an AND gate 200 whose output signal INC on line 211 will increment an equal character counter 212a which is part of a frame counter circuit generally indicated by the numeral 220 of which there are four since a UPC tag can have up to four frames. The equal character counter 212a counts the number of equal characters in the frame. The counter is reset when the signal 2 EQUAL CHAR/ appearing on line 224a goes low enabling the AND gate 222a to output the signal RESET over line 230a which resets the counter 212a.

As the equal character counters 212a-212d inclusive are incremented, the count is outputted over line 216 to a decoder unit 218a which outputs over lines 240a-240g inclusive, one of the signals CNT 1-CNT 7 representing the count in the associated counter. These signals are transmitted over line 116a to the prebuffer unit 74 for controlling the operation of the FIFO storage unit 80 as previously described. These signals are also transmitted to logic circuits which decode UPC tags identified as HARD (FIG. 14A) and EASY (FIG. 14C) as will be described hereinafter. The interval counter 66 (FIG. 12A) generates the clock signal INT CLK which appears on line 122 and which increments frame counters 206, 208 whose output counts will be inputted over lines 202 and 204 into the AND gate 200 conditioning the gate to output the incrementing signal INC to the equal character counters 212a-212d inclusive upon the generation of the signal 2 EQUAL UPC CHAR over line 173.

The microprocessor 44 (FIG. 11) can select from among several UPC filter criteria. Those criteria are: (1) Four sequential equal characters (UPC Easy), (2) Four sequential equal characters with a leading or trailing center band (UPC EAN8), or (3) Six sequential equal characters with a leading or trailing center band (UPC Hard). The decoded counts of the UPC equal character counters 212a-212d inclusive are fed to logic circuits (FIG. 14A) whose various portions are enabled by the microprocessor, depending on the criteria desired. There are four sets of logic circuits used, in order to track the equal count decodes by the equal character counters as will now be described.

In the UPC Easy case (FIG. 14C), if the interval data stream is good tag data, one set of the logic circuits will be tied to its corresponding equal character counter 212 (FIG. 14B), which in turn will be incrementing every four intervals, as each successive character in that character frame is found to be equal with the previous character. When its associated decoder unit 218 reaches a count of three, which means four consecutive equal characters have been detected, this logic circuit will insert a start bit into the UPC tag bit in the prebuffer unit 74 at register position 23 as will be described hereinafter. This bit may eventually enable the FIFO storage unit 80 to store the data bits outputted by the prebuffer unit. The significance of this position is that the interval data that contains the four equal characters will have moved to a position in the prebuffer unit where the first interval of the first equal character is sitting in position 18, at the time the fourth character is determined to be equal. Since we always put a character's worth of leading center band intervals in front of data that has met this criteria, the first interval of that header is sitting in register position 22 in the prebuffer unit. Since it will take one more INT CLK signal for the bit to be placed into the UPC tag bit stream, it should go in at position 23. The above assures that the beginning of the data and header, that has met the criteria, will pass into the FIFO unit. The significance of the header and trailer (the same procedure is used at the eventual end of the equal data) is its value to the microprocessor 44. These additional intervals can tell the microprocessor whether there are margin or guard bars ahead of, or behind, the equal characters, which aids it in its function of decoding and building the data from a complete tag. Eventually, the sequence of consecutive equal characters in the good frame will end. Valid UPC tags can have no more than seven consecutive equal characters. When a character comes in that is unequal in the good frame, that equal character counter will be reset to "0". The logic associated with that counter will (if the counter had previously reached the count of 3, on this run), insert a stop bit into the UPC tag bit in the prebuffer at position 3. This position corresponds to the first interval of the next character following the unequal character. The unequal character, plus the first interval of the next character, supplies the five intervals of trailer. We now have a tag bit, in the UPC tag bit stream, that is on the same frame as a previous "start" bit.

Referring now to FIG. 14C, there are disclosed the logic circuits 243 for detecting a UPC EASY tag in the manner discussed above. The circuits, of which one is shown in FIG. 14C, include a plurality of AND gates 244, 250, 262, 266 and 268 where the gates 244, 250 and 262 receive over line 242 which is part of the bus 36 (FIG. 12), the signal UPC EASY from the microprocessor 44. The AND gate 244 also receives over line 240c the count signal CNT3 from the decoder unit 218a (FIG. 14B) as representing four equal characters which have been counted by the character counter 212a. When these signals are present, the gate 244 will output a high signal over line 270 of bus 43 (FIG. 11) telling the microprocessor 44 to insert a start bit into the UPC tag at register position 33 in the prebuffer portion 78 (FIG. 12C). In a similar manner, the AND gate 266 will output a signal over line 272 of bus 43 to insert a stop bit at register position 3 if the signals CNT 0 CNT 7 NOT OCC and CNT 3 OCC are present. The signals other than the actual count signals described hereinafter with respect to the UPC logic circuits are transmitted from the decoder units 218a–218e inclusive over bus 275. The AND gate 268 will output a signal over line 274 to NULL or remove a start bit at register position 39 if count 3 has occurred and you have a CNT 7 EDGE signal appearing on line 260 which represents the edge of the CNT 7 signal appearing on the output of the associated decoder unit. This action removes a start bit after four equal characters when eight equal characters has been detected, which is the limit for a half of a UPC tag. Any more data after that is invalid data.

In the UPC EAN8 case (FIGS.16A and 16B), the unequal character ahead of the stream of at least four equal characters, or the unequal character behind the stream of at least four equal characters, must be a UPC center band. An incoming center band (header) will appear as four intervals of an alternating bar-space pattern, with each interval being one module in width. An outgoing center band (trailer) will appear as four intervals of an alternating space-bar pattern, each interval being one module in width. A module is the minimum unit of relational width permitted for a bar or space, on a valid tag. To detect an In Center Band, the two interval sum of the first two intervals of the center band (IN9-IN10) and the two interval sum of the last two intervals of the center band (IN8-IN7) are compared to percentages of the sum of the next character (four intervals). If each of the 2 term sums are greater than or equal to 7/32 of the character sum, and if each of the 2 term sums are less than 11/32 of the character sum, and the adjacent character whose sum was used, proves to be the first of at least four consecutive equal characters, then we say the data is valid. To detect the center band, the same logic is used, except the 2 term sums come from IN3-IN4 and IN1-IN2, and the previous adjacent character must be used. That character must be at least the fourth character in a string of consecutive equal characters. If the above criteria are met, a start bit is placed in a proper position, as described previously, for a UPC Easy tag. The stop bit determination and bit placement is performed as previously described for a UPC Easy tag, in the In Center Band case. In the Out Center Band case, the stop bit is inserted at the same time as the start bit (different position), since the center band detected represents the end of valid data.

Referring now to FIG. 16A, the logic for detecting a UPC EAN8 tag includes the signal VID 1 which represents the value (bar or space) of the first interval of data (VIDEO) being loaded into the prebuffer unit 74 (FIG. 12D). This signal is transmitted over line 434 through the non-inverting inverter 436 which outputs the enabling signal EN MUX A over lines 438 and 440 to the multiplexers 374, 392 and 386 selecting either the A input or the B input of the multiplexer depending if VID 1 represents a bar (high) or a space(low). A bar or space at this time (VID 1) determines whether the incoming data is a valid incoming or outgoing center band. The signal EN MUX A is also transmitted over line 431 to the multiplexer 408.

Appearing on the input line 177 to the A input of the multiplexer 374 is the signal IN1+IN2 representing the sum of the first two intervals outputted by the adder 166 (FIG. 12B) indicating the occurrence of the first two intervals of an outgoing center band. In a similar manner, the signal IN3+IN4 appearing on the input line 179 to the multiplexer 392 also represents the occurrence of last two intervals of an outgoing center band. The signal SUM4+7/32+1 DLY appearing on line 388 of the bus 75 (FIG. 12B) is inputted into the multiplexer 386 representing 7/32 of the sum of the next character adjacent an outgoing center band. The signal SUM4+11/32+3 DEL appearing on line 412 of the bus 75 (FIG. 12B) and inputted into the multiplexer 408 represents 11/32 of the next character adjacent an outgoing center band.

The appearance of the low signal EN MUX A on line 440 representing the occurrence of a space results in the operation of the multiplexer 374 which selects the signals IN7 and IN8 appearing on lines 378 and 380 for summation by the adder circuit 376 and inputted into the B input of the multiplexer 374, the signals IN9 and IN10 appearing on lines 396 and 398 and which are summed by the adder 394 for input into the multiplexer 392, the signal SUM4+7/32+3 DEL appearing on line 390 and which is inputted into the multiplexer 386, the signals SUM4+11/32+1 DEL appearing on line 410 and SUM4+11/32+3 DEL appearing on line 412 which are inputted into the multiplexer 408. These signals represent an incoming center band and the percentage of the sum of the next character adjacent the center band as described previously. The output signal of the multiplexer 374 is inputted over lines 380 and 381 to one input of the comparators 382 and 402. The output signal of the multiplexer 392 is inputted over lines 400 and 401 to one input of the comparators 404 and 406 while the output signal of the multiplexer 386 is inputted over line 384 to the other input of the comparator. The output signal of the multiplexer 408 is inputted over line 385 to the other input of the comparators 402-406 inclusive. The comparators will compare the sum of the first and last two intervals of the center band with a percentage of the sum of the next character to detect an in center band and compare it with the sum of the previous character to detect an out centerband.

The output signals of the comparators 382 and 402–406 inclusive are transmitted over lines 416–422 respectively to an AND gate 424 (FIG. 16B) whose out signal CB DETECT IN or CB DETECT OUT is transmitted over line 426 to one input of an AND gate 430 and over line 428 to an AND gate 432 (FIG. 16A). As described previously, the signal EN MUX A appearing on line 438 will be high if the interval VID 1 is a bar indicating the presence of an outgoing center band and low if VID 1 is a space indicating an incoming center band. The signal EN MUX A appearing on line 438 is transmitted through the inverter 442 (FIG. 16A) to the other input of the AND gate 432 enabling the gate to output the signal CB DETECT IN over line 446 to a fourteen interval circuit 448 whose output signal is transmitted over line 450 to one input of an AND gate 452 which is part of a logic circuit generally indicated by the numeral 453 which will decode one frame of data. This circuit is repeated for the other three frames of data associated with a UPC tag. The signal CB DETECT IN is also transmitted over line 300 to the decoding circuits associated with the UPC hard tag (FIG. 14A) as previously described.

The signal EN MUX A is also transmitted over line 431 (FIGS. 16A and 16B) to the other input of the AND gate 430 enabling the gate to output the signal CB DETECT OUT over line 433 to the AND gates 454–460 inclusive of the circuit 453. The signal is also transmitted over line 435 to the UPC hard tag decoding circuit (FIG. 14A) as previously described. The AND gates 452–460 inclusive also receives over line 474 the enabling signal EAN8 EN from the microprocessor 44 (FIG. 11) and over lines 472 and 476–480 inclusive the output count signals from its associated frame decoder unit 218 (FIG. 14B) transmitted through a two interval delay circuit (not shown). If the input signals as indicated in FIG. 16B are active, the AND gates 452–460 inclusive will output the signals CONDITION 1–CONDITION 5 inclusive indicating the presence of four equal characters and either an incoming center band (CONDITION 1 and 5) or an outgoing centerband (CONDITION 2–4 inclusive).

As shown, the signal CONDT 1 (CONDITION 1) is inputted over line 482 to a non-inverting inverter circuit 462 which outputs the signal INSERT START BIT AT 25 over line 492 which is part of bus 43 for transmission to the prebuffer unit 74 (FIG. 12C). In a similar manner, the signal CONDT 2 is transmitted over line 484 through the non-inverting inverter 464 for outputting the same signal. The signals CONDT 1 OCC, CNT 0 and CNT 7 NOT OCC appearing on lines 362, 354 and 356 respectively representing the condition of the output signals of its associated frame decoder 218 (FIG. 14B) are inputted into the AND gate 466 which if the signals are active will output the signal INSERT THE STOP BIT AT 3 over line 496 to prebuffer unit 74. The AND gate 468 receives the signals CONDT 1 OCC and CNT 7 EDGE over lines 362 and 364 respectively to output the signal NULL START BIT AT 39 which removes the start bit at that position in the prebuffer unit 74. Further included in the circuit 453 is the OR gate 470 which receives any of the signals CONDT 2, CONDT 3, CONDT 4 and CONDT 5 over lines 484–490 inclusive respectively enabling the gate 470 to output the signal INSERT STOP BIT 1 over line 498 to the prebuffer unit 74 indicating the presence of an UPC EAN8 tag in the data being transmitted through the prebuffer unit.

In the UPC Hard case (FIGS. 14A and 14B), the logic is the same as will be described for the UPC EAN8 case, except that at least six equal consecutive characters are required ahead of, or behind, a center band. Since UPC tags have defined lengths, normally no more that six equal characters in each half of the tag, logic has been included to discard UPC data that meets a programmed criteron, if it contains more than seven consecutive equal characters. If the criteron is met, after a total of eight consecutive equal characters detected, the logic will null the start bit at the position it has advanced to in the prebuffer unit as described above. This data will not be stored in the FIFO unit. Once eight equal characters are detected, the activated equal character counter will latch and not reset until a CHAR UNEQUAL signal occurs.

As shown in FIG. 14A, the detection of the start of a center band 21 (FIG. 1) as previously described (FIG. 16B) results in the center band detect signal CB DETECT IN appearing on line 300 which is transmitted through a delay circuit 302 to be inputted over line 306 to one input of an AND gate 308 which is part of a circuit 304 associated with one of the decoder units 218a–218e inclusive (FIG. 14B) and which receives the output of an associated equal character counter 212. The AND gate 308 also receives over line 310 the signal CNT5+2 DEL which is derived from the signal CNT5 outputted from its associated decoder unit 218 and transmitted through a two interval delay circuit (not shown). The AND gate 308 also receives over line 312 from the microprocessor 44 (FIG. 11) the signal UPC HARD which when active, will enable the gate to output the signal CONDITION 1 when the other two signals are active. In a similar manner, the signals UPC HARD and CNT5+2DEL are transmitted to AND gates 324 and 326 which also receives over line 435 (FIG.16B) the signal CB DETECT OUT indicating the end of the center band as previously described.

The output signal CONDITION 1 appearing on line 314 is transmitted through the non-inverting inverter 316 which outputs the signal INSERT START BIT AT 33 over line 318 to the non-inverting inverter 320 which outputs the signal over line 322 which is part of the bus 43 (FIGS. 11 and 11B) to the prebuffer unit 74. In a similar manner, the signal CONDITION 2 appearing on line 336 will also result in a start bit being inserted at register position 33 in the register portion 75 of the prebuffer unit 74 (FIG. 12D). The signal CONDITION 2 is also transmitted over line 344 to one input of an AND gate 342 which also receives over lines 338 and 340 the signal CONDITION 3 resulting in the signal INSERT STOP BIT AT 1 indicating the occurrence of six equal characters following a center band.

Further included in the logic are the AND gates 350 and 360. The gate 350 receives the active signals CONDT I OCC over line 352, CNT0 over line 252 and CNT 7 NOT OCC over line 254 resulting in the gate 350 outputting the signal INSERT STOP BIT AT 3. In a similar manner, the AND gate 360 receives the signals CONDT 1 OCC and CNT 7 EDGE over lines 362 and 260 respectively resulting in the signal NULL START BIT AT BIT 39 which removes the start bit from register position 39 in the register portion 78 of the prebuffer unit 74 as explained previously with respect to the UPC easy tag logic (FIG. 14C).

A final mode of operation that the microprocessor can select for the UPC filter is the periodical mode. This mode can be used in conjunction with any of the other three. The periodical tag has several characters of intervals suffixed behind the margin of the UPC tag. In the logic, the periodical mode simply adds 16 additional intervals of header, and 16 additional intervals of trailer to the good tag data in the prebuffer unit. The header or trailer will thus contain the intervals of the suffixed characters, as the scanning beam scans across the tag, and allows the microprocessor to search them out. As shown in FIG. 14D, the microprocessor 44 (FIG. 11) will transmit over bus 50 (FIG. 11B) the periodical select signal SEL PERIOD which is transmitted over line 280 to a plurality of multiplexers 282a-282h inclusive. When the select signal is not active, the multiplexers will output over lines 284 an insert start bit signal at a register position in the prebuffer portion 78 (FIG. 12C) corresponding to the bit position being inputted over lines 270, 272 and 274 from the circuit 273 (FIG. 14C) representing a UPC easy tag into the multiplexers. The remaining input lines are from logic circuits associated with UPC hard tags and UPC EAN8 tags. The multiplexer 282c and 282f will insert a stop bit at the same position being inputted into the multiplexer. When in a periodical mode, the signal SIG PERIOD will be active high enabling the multiplexers 282a, 282b, 282d, 282e, 282g and 282h to insert a start bit at a register position which is sixteen positions later than the bit position being inputted into the multiplexer as describe previously. The multiplexers 282c and 282d will output the signals through eighteen bit position delay circuits 290 and 292 to insert stop bits ahead of the bit position being inputted.

Figure 17A:
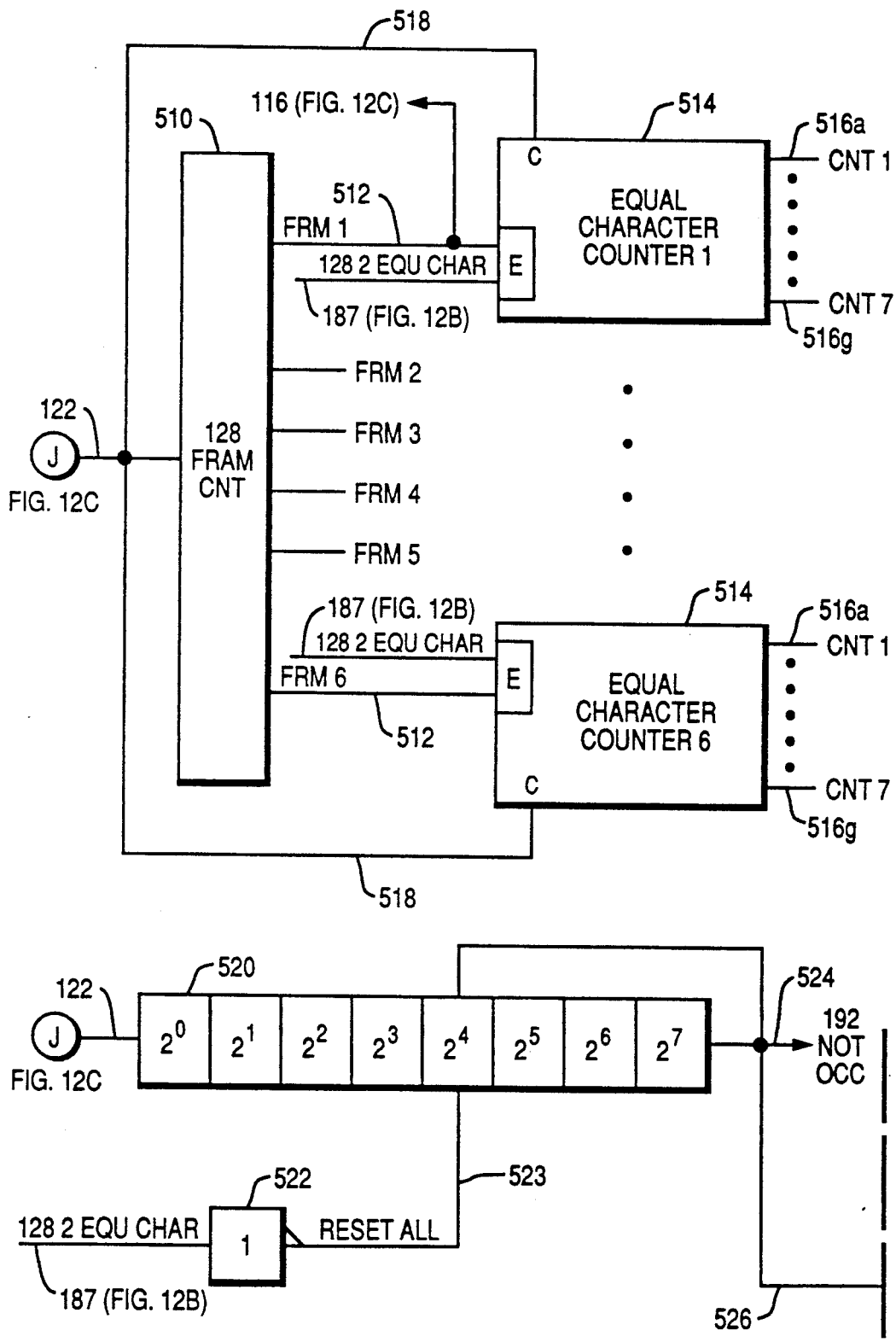
FIGS. 17A and 17B taken together are a detailed block diagram of the code 128 filter of FIGS. 11 and 11C.
Figure 17B:
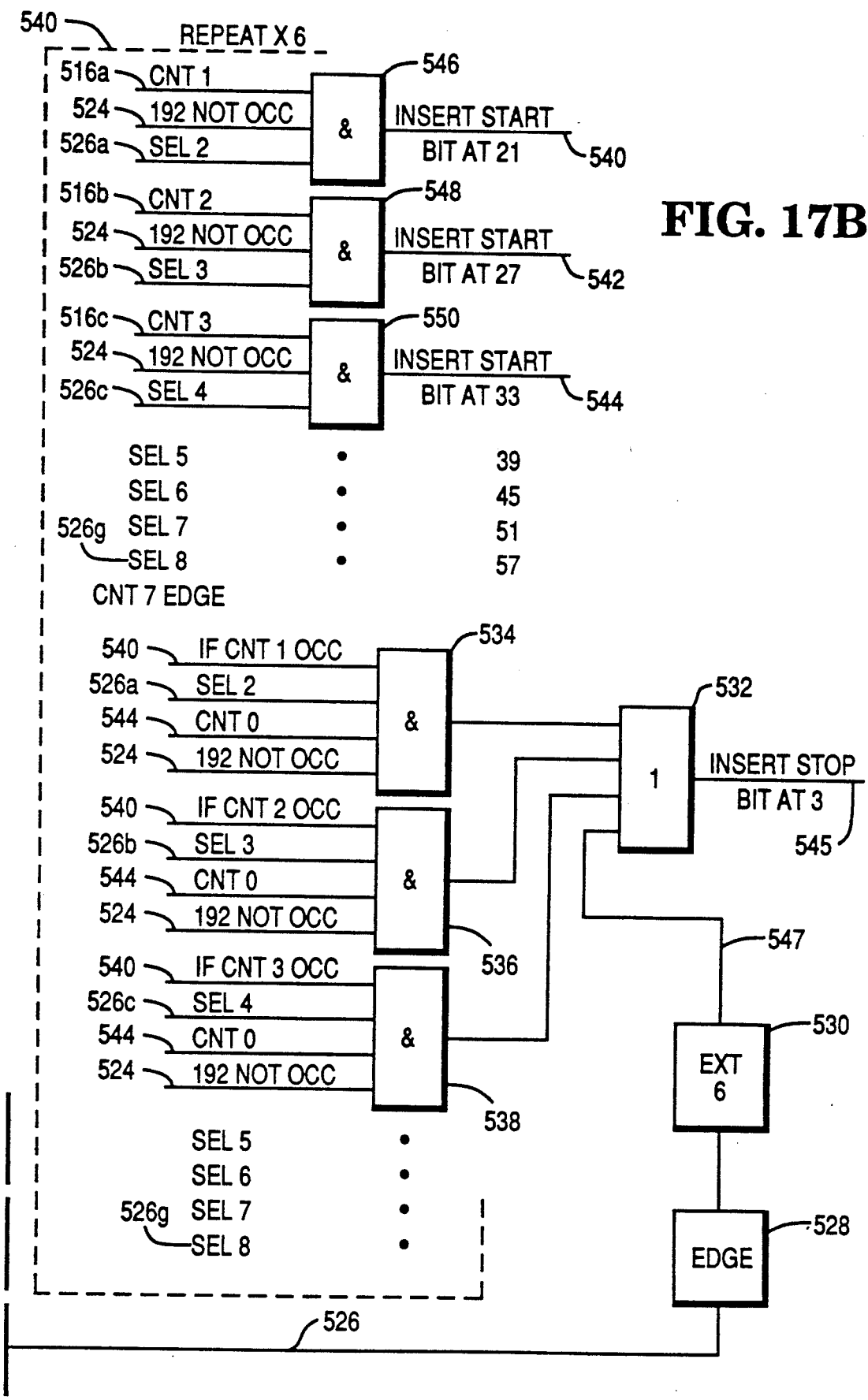

Referring now to FIGS. 11C, 17A and 17B, there is shown a detailed block diagram of the logic circuits for the code 128 filter 40 (FIG. 11). The CODE 128 tag is defined as having six intervals per tag character. Therefore, the previous 6 term sum, the new 6 term sum, 27/32 of the previous 6 term sum, and 27/32 of the new 6 term sums is used in the logic to generate 128 2 EQU CHAR terms at each interval clock, if the compare conditions are met. A 128 2 EQU CHAR term is generated if the new 6 term sum is greater than or equal to 27/32 of the previous 6 term sum and the previous 6 term sum is greater than or equal to 27/32 of the new 6 term sum. Note that the 27/32 can be adjusted up or down by the microprocessor 44. A frame counter, clocked by INT CLK's is continuously counting from 0 thru 5 and over again. The six decoded states of this counter provide the 128 frame count terms. These terms delineate the beginning of one of six possible good tag characters every six intervals. Each of these terms selects one of six possible 128 equal character counters. These counters will increment each time they are selected by their frame term and a 128 2 EQU CHAR term is also present. This allows the counters to track how many equal characters in a row are detected on a specific character frame. The counters will be reset anytime a 128 2 CHAR UNEQUAL occurs on their frame. This construction provides the means to detect and count 128 good tag characters that are in sequence, in an interval stream.

The microprocessor 44 can select from seven 128 filter criteria. These are: two characters equal for minimal filtering and incrementally to eight characters equal for maximum filtering. The decoded counts of the 128 equal character counters are fed to logic circuits whose various elements are enabled by the microprocessor, depending on the criteria desired. There are six sets of the logic circuits in order to track the equal count decoded in each character frames.

Each of the criteria selections in the CODE 128 filter operate very similarly to the UPC Easy selection. However the CODE 128 character consists of six intervals, not four for the UPC character and the header and trailer portions consist of six and seven intervals, respectively. Also, the number of consecutive equal characters required to insert start bit varies, and is set by the microprocessor generated criteria. The start and stop bits are placed into the 128 tag bit stream in the prebuffer unit 74.

There is no maximum number of characters that can be contained in a 128 tag. However, in the event that a continuous stream of equal intervals are fed into the logic circuits, a counter keeps track of the number of consecutive intervals that occur without an intervening 128 2 CHAR UNEQUAL condition. When 32 characters with all frames being equal, have been detected, six stop bits are inserted into the 128 tag bits to disable the FIFO ENABLE signal outputted by the OR gate 106 (FIG. 12D). The counter will be latched putting all 128 logic circuits on hold, until a CHAR UNEQUAL signal is detected which resets the counter.

As shown in FIG. 17A, a 128 frame counter 510 will count the interval clock signals transmitted over line 122 and output the frame signals FRM 1-FRM 6 inclusive upon the occurrence of six intervals over line 116 to the prebuffer unit 74 for controlling the generation of the FIFO ENABLE signal (FIG. 12D). The counter 510 will output frame signals over line 512 to an associated equal character counter 514 which is enabled by the signal 128 2 EQUAL CHAR appearing on line 187 and outputted by the comparator 186 (FIG. 12B) as previously described. The counters 514 will output the count signals CNT 1-CNT 7 inclusive over lines 516a-516g inclusive each representing the number of equal characters detected in sequence with each counter outputting only one count signal. Each counter is clocked by an interval clock signal appearing on line 518.

Also located in FIG. 17A is a counter 520 which will count the interval clocks appearing on line 122 up to a count of 192 for each frame. It will only be enabled if a string of 128 equal characters is detected, one for each interval limiting the 128 tag to thirty-two characters. If the counter detects more than thirty-two 128 characters and all frames are equal, the counter will reach the count of 192 and shut down. This condition indicates that a pattern is being read which is giving false equal readings and any subsequent data should not be stored in the FIFO storage unit 80 (FIG. 12D). If the counter reaches the count of 192, the signal 192 NOT OCC appearing on lines 524 and 526 will go low. If the counter is reset prior to reaching the count of 192, the signal will go high. This signal is used in the logic for locating the start and stop bits in the prebuffer unit 74d as will be described hereinafter. The counter 520 is reset by the signal RESET ALL appearing on line 523 and outputted from the inverter 522. The signal is generated whenever the signal 128 2 EQU CHAR appearing on line 187 goes low representing the appearance of characters not being equal (128 2 CHAR UNEQUAL).

As shown in FIG. 17B, the count signals CNT 1-CNT 7 inclusive appearing on lines 516a-516g inclusive are inputted into seven AND gates three of which are shown in FIG. 17B. The AND gates also receive over lines 524 the signal 192 NOT OCC and over lines 526-534 inclusive the select signals SEL from the microprocessor 44 indicating the number of sequential equal characters required before the data stream being shifted through the prebuffer unit 74 has begun to be captured. For example, when the signal SEL 2 goes high, the AND gate 546 will output the signal INSERT START BIT AT 27 over line 540 which is part of bus 43 (FIG. 11C). In a similar manner, start bits are inserted at bit positions 27, 33, 39, 45, 51, and 57 in response to the generation of the select signals SEL 3-8 inclusive. In a similar manner, stop bits are inserted in position 3 when the input signals appearing on the input lines to the AND gates 534-538 inclusive are active high. Input signals present in addition to the signals described above include the signals IF CNT 1 OCC - IF CNT 7 OCC appearing on lines 540 enabling the gates 534-538 inclusive to output signals to an OR gate 532 which outputs the signal INSERT STOP BIT AT 3 over line 545 to the prebuffer unit 74. The OR gate 532 receives over line 547 six successive signals derived from the signal 192 NOR OCC appearing on line 526 which is transmitted through the latch circuit 528 and the extend by six circuit 530 which extends the signal INSERT STOP BIT AT 3 by six clocks to insert six stop bits in the prebuffer unit 74 to stop all of the framed data being generated by the start bits inserted during the time the counter 520 is counting up to the count 192.

Referring now to FIGS. 11F and FIGS. 18A-18E inclusive, there is shown a detailed block diagram of the code 2 of 5 and code 3 of 9 filter 42 (FIG. 11). The CODE 3 of 9 tag is defined as having ten intervals per tag character. The CODE 2 of 5 tag is defined as having ten intervals per interleaved, character (two characters). With this many intervals in each character, the use of the sum of Adjacent Character approach to discriminate the characters drops below acceptable levels of probability. Another characteristic of these tags, however, can be used to provide character identification. The 3 of 9 tag, within its ten intervals of character, will have three wide intervals. The 2 of 5 tag, within its ten intervals of interleaved character, will have four wide intervals. If each interval of a new frame of ten intervals, positioned in the prebuffer, is determined to be between 7/64 and 14/64 of the new 10 term sum of those intervals, then those that meet the above window are wide intervals. Note that the 7/64 and 14/64 can be adjusted up or down by the microprocessor. In implementation, two different intervals are compared at the same time, to halve the total time necessary to complete the process, because all compares must be completed in one interval clock time. Each wide interval will increment a counter. After the ten compares are complete, a compare of the output of this counter is made. If a good 3 of 9 character is properly framed, the output of the counter will be three. If a good 2 of 5 character is properly framed, the output of the counter will be four. On the next interval clock, if the criteria are met, a bit will be placed into a ten bit delay register and the counter reset. If the two equal character equal has been selected, and the previous character on this frame had been identified as good, a bit would be coming out of the ten bit delay register at the same time the new bit is going in. This causes the remaining logic to insert a start bit into the 3 of 9 and 2 of 5 tag bit stream, at the proper place in the prebuffer unit. A counter, clocked by the INT CLK signals, is continuously cycling from 0 thru 9. The ten decoded states of this counter provide the 3 of 9 and 2 of 5 frame count terms. Whenever a frame running on good characters (having inserted a start bit) does not see the good character bit on a new character, the logic will insert a stop bit at the proper place in the prebuffer. The header and trailer for 2 of 5 and 3 of 9 tags is ten and eleven intervals, respectively.

The microprocessor can select from three 2 of 5 and of 9 filter criteria. These are two, three, or four consecutive good characters. Additional ten bit delay registers are inserted to keep track of the status of additional previous characters as the filter criteria goes up.

Since 3 of 9 tags have intercharacter gaps that are not tightly specified, it is possible to run into 3 of 9 tags that have such wide gaps that these intervals will invalidate the 10 term sum used to determine the three wide intervals. Therefore, logic has been included to kill the three and four count comparators, if an interval is greater than the upper limit for a wide interval, unless it is the end interval, 3 of 9 has been selected, and the interval is a space. If the above exception criteria are met, it will indicate that the intercharacter gap is framed properly and the data can be used. If the above types of 3 of 9 tags are encountered, it will often be necessary to run with 2 of 5 as well, because good 3 of 9 tags will frequently give counts of four.

Additionally, logic has been incorporated which will reject a 3 of 9 character if the last interval of the frame is a bar, and the logic added which will prevent the 3 of 9 counter from being incremented by the last interval of the frame, if only 3 of 9 is selected. In the first case, it is illegal for a 3 of 9 tag to end on a bar, and in the second case, the 3 of 9 inter-character gap may look like a wide interval, but should not be counted. Also, if any interval in a frame is decoded to a value of 7ffh (the counter overflow condition), the three and four count comparators will be killed for that frame. In the above case, the data in the frame can never be valid data.

Referring now to FIG. 18A, appearing on the input line 434 are eleven video bits corresponding to eleven intervals represented by the signal VID (11) which are inputted into the second register 546 of the first eleven registers in the register portion 75 corresponding to the register portion 75 of the prebuffer unit 74 (FIG. 12C). Interval clocks appearing on line 122 will clock the intervals through the register portion 75 and be transmitted over line 560 to a pair of five state counters 562 and 564 clocking the counters through five states. The ten bits of data representing the value of the interval in the register 546 are outputted over the ten bit wide bus 552 to a multiplexer 570 which also receives over the bus 554 the data in the sixth register 548 of the register portion 75. In similar manner, the data stored in the sixth register is also transmitted over the bus 556 to a second multiplexer 570 which also receives over bus 557 the data stored in the eleventh register 550.

Figure 18C:
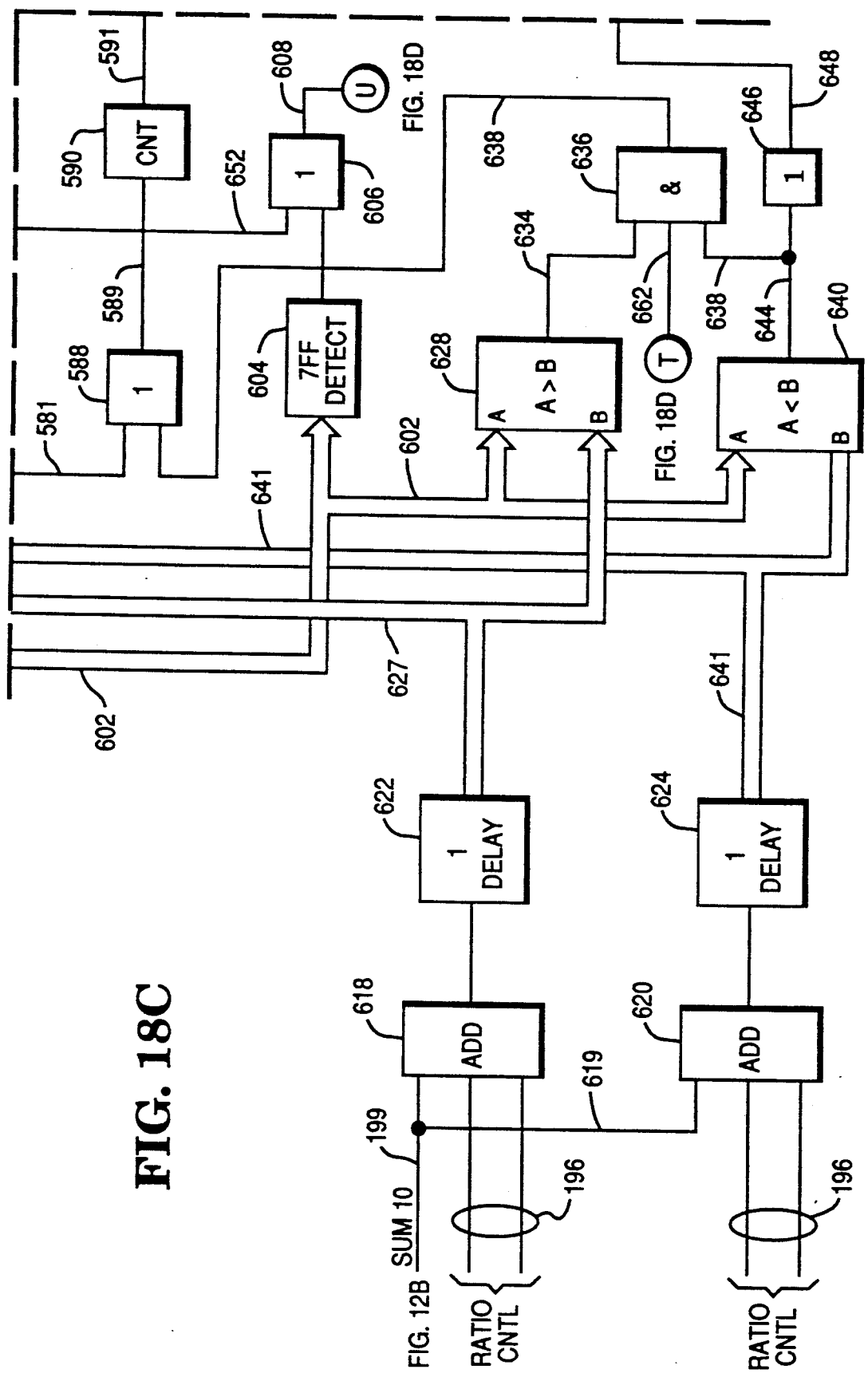

The first count of the counters 562, 564 will be transmitted over lines 558 and 565 respectively to the multiplexers 570 and 572 selecting one of the incoming buses for transmission over the output bus 572 of the multiplexer 568 of the output bus 602 of the multiplexer 570. It will be seen that two intervals can be processed simultaneously with this construction. The bus 572 is inputted into the A input of the comparators 574, 576 and the 7FF detector circuit 650. The bus 602 is inputted into the A input of the comparators 628, 640 and the 7FF detector circuit 604 (FIG. 18C). The B input of the comparators 574 and 628 receives over bus 627 a ten bit value outputted from an adder 618 (FIG. 18C) which receives the ten interval sum signal SUM 10 representing a whole character and appearing on line 199 and a ratio control value over lines 196 from the microprocessor 44 which in the present example is 7/64. In a similar manner, the B input of the comparators 576 and 640 receives over bus 641 a ten bit value outputted from an adder 620 (FIG. 18C) which also receives the ten interval sum signal over line 619 and a ratio value of 14/64. The resulting ratio value of the ten interval sum outputted from the adders 618, 620 is transmitted through one interval delay circuits 622 and 624 respectively and over buses 626 and 624. The difference between the reference values of 7/64 and 17/64 presents a window which defines a wide interval.

If the actual value appearing on the A inputs meets the comparison criteria of the comparators defining a wide interval, a high signal will appear on the output line 575 of comparator 574 and line 577 of comparator 576 which are inputted into the AND gate 578 whose output high signal is transmitted over line 581 through the OR gate 585 (FIG. 18C) to the counter 592 (FIG. 18D) over line 591 which counts the number of wide intervals detected. The signal on the output line 577 is also inverted by an inverter 580 (FIG. 18A) and transmitted over line 612 to the OR gate 610 (FIG. 18D) for controlling the operation of the comparator as will be described more fully hereinafter. In a similar manner, the high output signals of the comparators 628 and 640 (FIG. 18C) appearing on the lines 634 and 644 and 638 are inputted into the AND gate 636 which also receives over line 662 a select signal from the NAND gate 654 (FIG. 18D) selecting either a 3/9 tag criteria or a 2/5 tag criteria as will be explained hereinafter. When all the input signals are active, the gate 636 will output a active signal over line 638 to one input of the OR gate 588. The output signal appearing on line 644 of the comparator 640 is also transmitted through an inverter circuit 646 and over line 648 to the AND gate 616 (FIG. 18D) whose output signal is transmitted over line 614 to the OR gate 610.

Figure 18D:
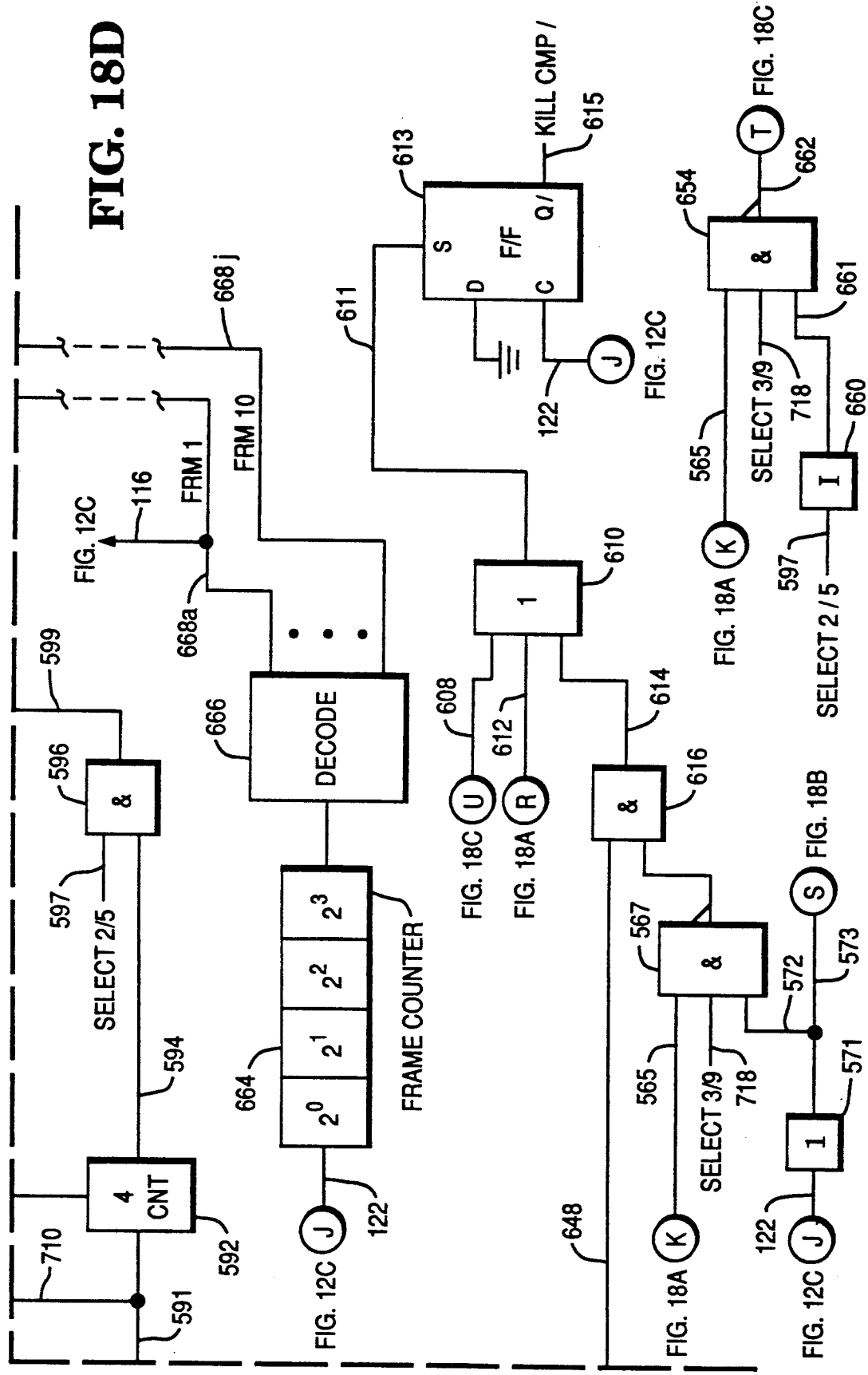

The count signal appearing on output line 591 of the counter 590 (FIG. 18C) is transmitted over line 710 (FIG. 18B and 18D) to the three wide interval counter 712. The counter will output a signal indicating the presence of three wide intervals over line 714 to one input of the AND gate 716 which also receives the signal SELECT 3/9 from the microprocessor 44 over line 718 and an interval clock signal appearing on line 573 and outputted from the inverter circuit 571 (FIG. 18D). When all the input signals are active, the gate 716 will output an active signal over line 717 through the OR gate 598 and over line 720 to one input of the AND gate 600. The OR gate 598 also receives an active signal over line 599 when four wide intervals are present in the data being loaded in the register portion 75 (FIG. 18A). This signal is outputted from the 4 wide interval counter 592 (FIG. 18D) and transmitted through the AND gate 596 when the active signal SELECT 2/5 transmitted from the microprocessor 44 appears on line 597. This signal is transmitted over line 720 to the AND gate 600.

The AND gate 600 (FIG. 18B) also receives a number of delay signals from three delay circuits 680, 682 and 684. The delay circuits are enabled by the interval clock signals appearing on line 122. The ten clock delay circuit 680 receives over line 690 the output signal of the OR gate 598 which inserts a bit into the circuit 680 indicating the presence of a character having either three of four wide intervals. The circuit 680 outputs the delayed signal over line 692 to one input of the AND gate 600. The delayed signal is inputted into the ten interval delay circuit 682 which outputs the twenty interval delay signal through the inverter circuit 696 and into one input of the AND gate 698. This signal will be outputted over line 700 to the AND gate 600 when either of the select control signals SEL 3, SEL 4, generated by the microprocessor 44, appear on the input line 702. The signals SEL 3, SEL 4 require that either three or four equal characters in sequence be wide intervals.

If the select signals SEL 3, SEL 4 are not active, the signal outputted by the gate 600 represents that two consecutive equal characters meet the wide interval configuration. The signal outputted from the delay circuit 682 is transmitted to the ten interval delay circuit 684 which transmits the thirty interval delay signal through the inverter circuit 686 to one input of the AND gate 688 which also receives the control signal SEL 4 over line 704 from the microprocessor 44. When all the input signals are active, the gate 688 will output an active signal over line 706 to the AND gate 600.

When all the input signals to the AND gate 600 are active indicating the presence of a 3/9 or 2/5 tag data, the gate will output over line 602 a high signal to one input of ten AND gates 676a–676j inclusive. The other input to the gates 676a–676j inclusive is coupled to a frame counter 664 (FIG. 18D) which counts the interval counts appearing on line 122 up to a value of ten. The counter 664 will output the counts to a decode unit 666 which outputs the frame signals FRM 1–FRM 10 inclusive over line 116 to the prebuffer unit 74 for controlling the operation the operation of the FIFO storage unit 80 (FIG. 12D) as previously described and over lines 668a–668j inclusive to one of the AND gates 676a–676j enabling the gate to output the high BAR signals BAR 1–BAR 10 inclusive over lines 678a–678j inclusive to a number of AND gates 724–738 inclusive (FIG. 18E) for inserting start and stop bits in the prebuffer unit 74 locating 3 of 9 and 2 of 5 character data.

The AND gates 724–738 inclusive will receive, in addition to the Bar signals, the frame signals FRM 1–FRM 10 inclusive over lines 668a–668j inclusive, the select signals SEL 2-8 inclusive over lines 526a–526g inclusive (FIG. 17B) from the microprocessor 44, the signal IF BAR 1 OCC over line 750a, the signal IF BAR 10 OCC over line shown over lines 752a, 752b and 750c. In response to receiving the above signals, the AND gates 724–738 inclusive will output signals through the OR gates 740–746 inclusive and over lines 756–762 inclusive to the register portion 75 of the prebuffer unit 74 for inserting start bits at register positions 32, 42 and 52 and a stop bit at register position 2 in the manner previously described with respect to the UPC and EAN8 decoding circuits.

As described previously, the three and four wide interval counters 712 (FIG. 18B) and 592 (FIG. 18D) are disabled whenever an overflow condition (7ffh) and the last interval of a 3 of 9 tag is a bar is detected. With respect to the first condition, the 7ff detectors 650 (FIG. 18A) and 604 (FIG. 18C) will generate high signals upon detecting the presence of 7ffh counts, which signals are transmitted through the OR gate 606 (FIG. 18C), over line 608, through the OR gate 610 (FIG.18D) and over line 611 to the set input of the flip/flop 613 which selects the Q/ output to transmit the signal KILL CMP/ over line 615 which disables the operation of the counters 712 (FIG. 18B) and 590. The OR gate 610 also receives over line 612 a signal from the inverter 580 (FIG. 18A) which will be high whenever the output signal of the multiplexer 576 goes low indicating that the interval being compared is greater than the upper limit for a wide interval. A similar condition occurs with respect to the multiplexer 640 (FIG. 18C) where the inverter 646 outputs a high signal over line 648 to one input of the AND gate 616 (FIG. 18D). The other input of the gate 616 receives the output of a NAND gate 567 which receives a signal over line 565 (FIG. 18A) representing whether the tenth interval is a bar (high) or a space (low). The gate also receives over line 718 the signal SELECT 3/9 from the microprocessor 44 and the interval clock signals appearing on line 122 and transmitted over line 572 to the gate 567. The logic will enable the flip/flop 613 whenever the tenth interval of a 3 of 9 tag is a bar which is illegal. The tenth interval signal appearing on line 565 is also inputted into an NAND gate 654 (FIG. 18D) which also receives over line 718 the select signal SELECT 3/9 and over line 661 from the inverter 660 the inverter signal SELECT 2/5 appearing on line 597. This logic will enable the gate to output a low signal over line 662 to the AND gate 636 (FIG. 18C) disabling the operation of the three and four wide interval counters 712 (FIG. 18B) and 593 (FIG. 18D) respectively whenever the interval is greater than the upper limit for a wide interval unless it is the tenth interval, the 3 of 9 tag has been selected and the interval is a space.

Figure 20:
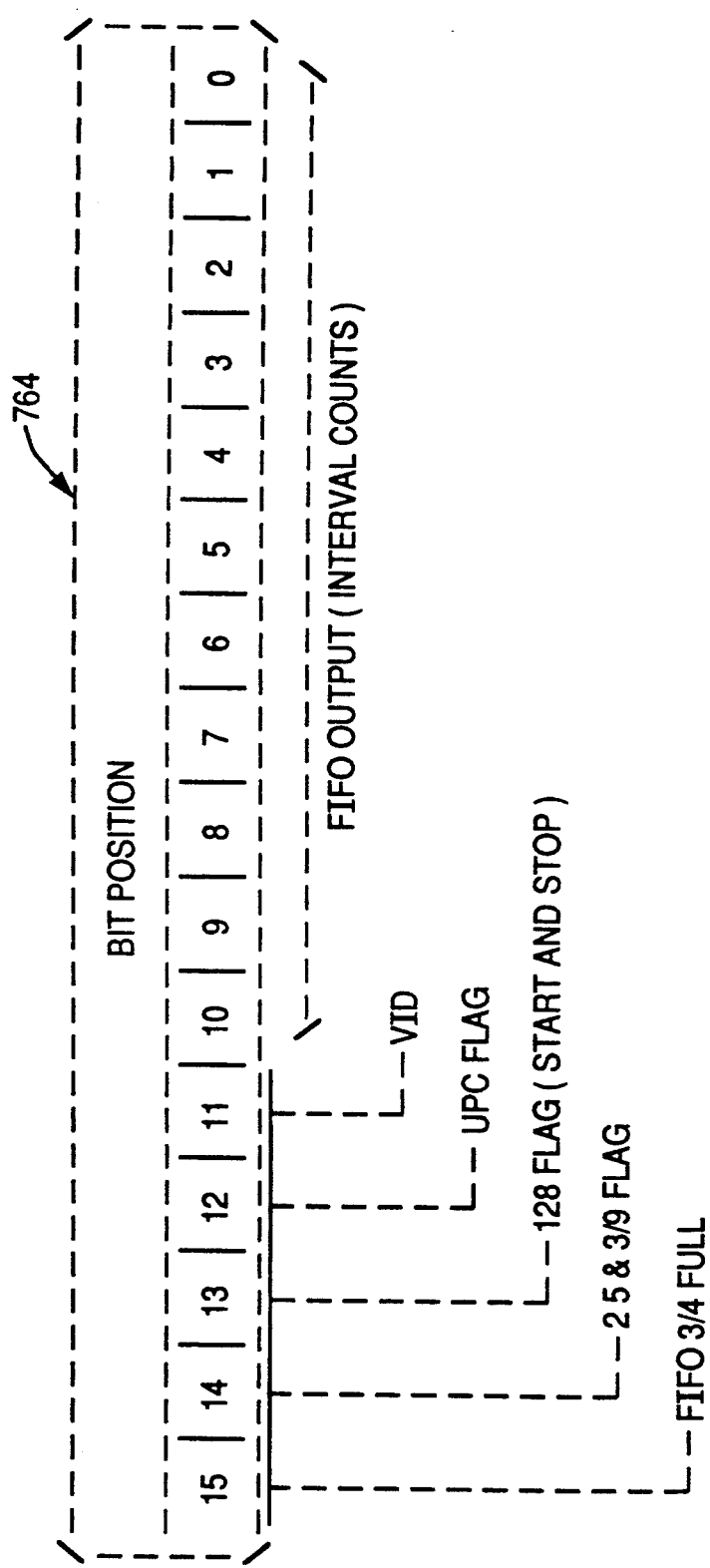
FIG. 20 is a diagram of an output register accessed by the microprocessor in processing the coded data.

Referring to FIG. 20, there is shown a schematic representation of a sixteen bit register 764 which is accessed by the microprocessor 44. Included in the register is the ten bit interval count (bit positions 1-10), the VID bit (position 11) representing the interval count as a bar or space, flag positions (positions 12-14) indicating that the count is either a part of a UPC, 128 or 2 of 5/3 of 9 tag and bit position 15 indicating that the FIFO storage unit 80 is 3/4 full telling the microprocessor to remove the data from the storage unit before an overflow condition can occur. The microprocessor 44 will read the bits in the register 764 and take appropriate action and process this data.

Figure 21:
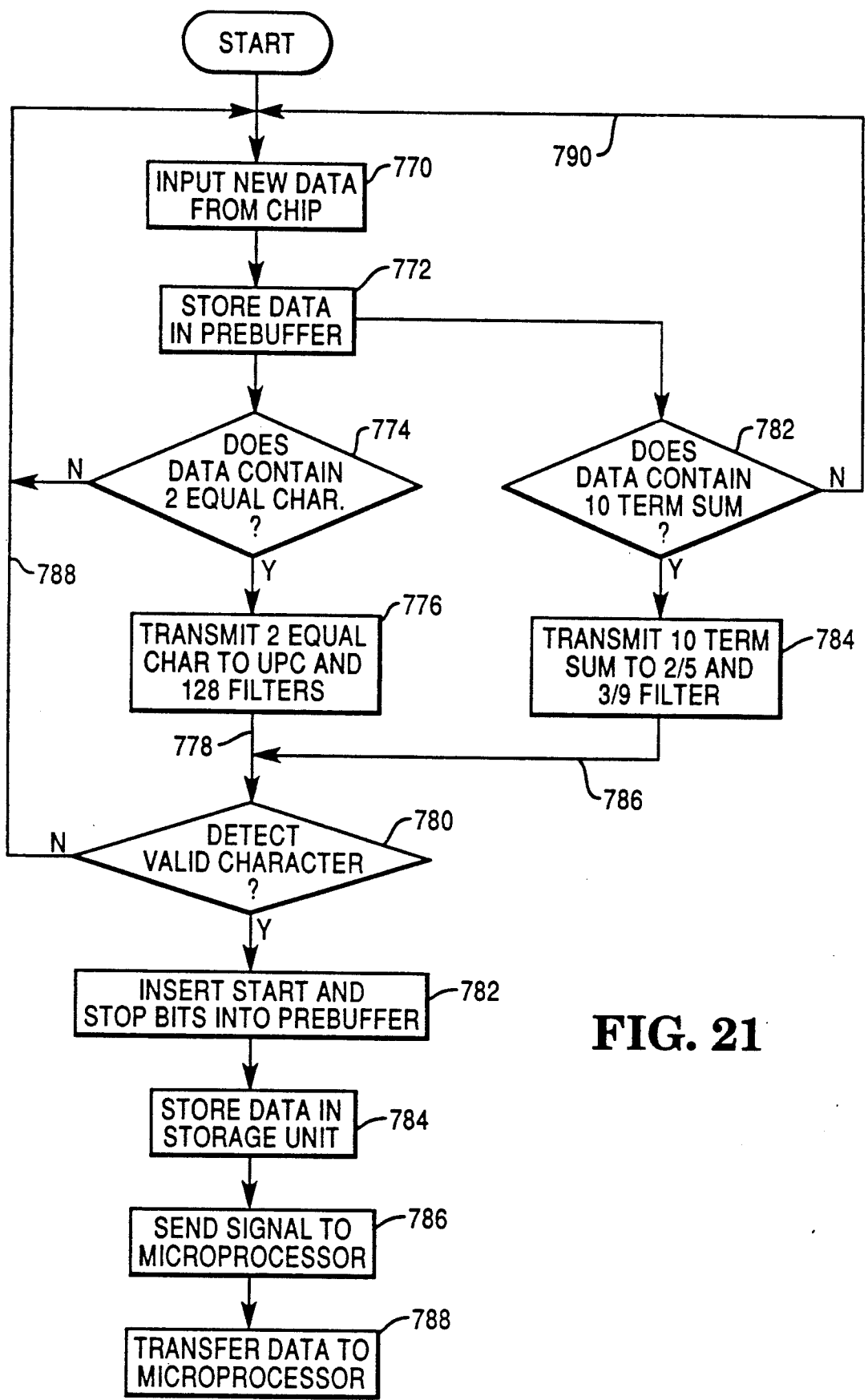
FIG. 21 is a flowchart of the decoding system for decoding multiple bar code labels.

Referring to FIG. 21, there is shown a flowchart of the decoding system for decoding multiple bar code labels in which the microprocessor 44 (FIG. 11) will transmit data from the optical scanner 31 (block 770) and store the data in the prebuffer unit 74 (block 772). The prebuffer unit will examiner the data to detect the presence of two consecutive equal characters (block 774). If no equal characters are found, the prebuffer unit will return over line 788 to detect if new data from the scanner is present (block 770). Upon finding two equal characters in the data stored in the prebuffer unit, the prebuffer unit will simultaneously transmit this information over line 778 to the UPC filter circuit 38 and 128 filter circuit 40 (block 776) which will detect if the equal characters comprise valid characters (block 780). If no valid characters are detected, the system will return over line 788 to block 770 to determine if new data is present from the scanner.

The prebuffer unit 74 will also determine if the data from the scanner contains ten consecutive intervals which meet predetermined width requirements (block 782) and if so, will transfer such information over line 786 to the 2/5 and 3/9 filter 42 which determines if such information contains a valid character (block 780). If there is a valid character in the data stored in the prebuffer unit 74, the filter circuits will insert start and stop bits in the data stored in the prebuffer unit (block 782) and store the data in the FIFO storage unit 80 (block 784) which sends the signal 3/4 Full to the microprocessor (block 786) which will read the data (block 788) for transmission to a remote processing unit.

It will be seen that the present processing system will be able to decode a plurality of different types of bar code labels in a minimum amount of time.

While the principles of the invention have now been made clear in an illustrative embodiment, it will be obvious to those skilled in the art that many modifications of structure, arrangements, elements and components can be made which are particularly adapted for specific environments and operating requirements without departing from those principles. The appended claims are therefore intended to cover any such modifications, within the limits only of the true spirit and scope of the invention.

What is claimed is:

1. A system for simultaneously decoding a plurality of different coded symbols each comprising a plurality of bars and spaces representing characters, comprising:
   means for generating data representing bars and spaces of one of said symbols;
   circuit means coupled to said generating means for applying first predetermined relationships to said data for generating signals representing continuous characters in response to receiving the data representing each consecutive bar and space whenever the relationships are satisfied;
   means for storing the data;
   a plurality of decoding means coupled to said circuit means for detecting valid and invalid characters in said signals; and
   each of said decoding means including means for inserting data bits in the data stored in said storing means locating the start and ending of a valid character in said data.

2. The system of claim 1 in which said circuit means comprises a large scale integrated circuit chip.

3. The system of claim 1 in which said circuit means includes means for detecting the width of consecutive bars and spaces comprising a character and means for comparing the width of a predetermined number of bars and spaces to determine the occurrence of two equal width characters which comprise said signals.

4. The system of claim 3 in which said circuit means further includes storage means coupled to said storing means for storing the data representing a valid character including the start and ending data bits in response to the generation of said start and ending data bits.

5. The system of claim 4 in which each of said decoding means includes means for counting the number of valid characters in said data and logic means for generating a control signal when said counting means reaches a predetermined count, said decoding means outputting said control signal to said storage means enabling said storage means to store the data stored in said storing means.

6. The system of claim 1 in which said inserting means comprises means for counting the occurrence of a predetermined number of valid characters and logic means for generating control signals enabling said storing means to insert a start and stop bit in the data stored in the storing means indicating the location of valid coded character.

7. The system of claim 6 in which one of said decoding means includes a UPC decoder.

8. The system of claim 6 in which one of said decoding means includes a 128 decoder.

9. The system of claim 6 in which one of said decoding means includes a 2 of 5 and 3 of 9 decoder.

10. The system of claim 1 in which said decoding means comprises three filter circuits each decoding a different bar code.

11. The system of claim 10, in which said filter circuits include a plurality of adders.

12. The system of claim 10, in which said circuit means includes means for determining the number of intervals per character.

13. The system of claim 12, in which different bar codes include a different number of intervals per character.

14. The system of claim 10, in which said circuit means includes means for detecting the presence of two equal characters.

15. The system of claim 14, in which certain bar codes are identified by the presence of two equal characters.

16. A system for simultaneously decoding a plurality of different coded symbols each comprising a plurality of bars and spaces representing characters, comprising:
means for generating coded data representing bars and spaces of one of said symbols;
first storage means for storing the coded data generated by said generating means;
first logic means coupled to said generating means for detecting the occurrence of two equal characters in the coded data, said logic means generating a first control signal upon detecting the two equal characters;
a plurality of filter means each associated with a different coded symbol and coupled to said first logic means for detecting valid and invalid characters in the coded data stored in the first storage means in response to the generation of said control signal;
second logic means in each of said filter means coupled to said first storage means for inserting data bits in the coded data stored in said first storage means locating the start and ending of a valid character upon detecting a valid character in said coded data;
means in each of said filter means for counting the number of valid characters in said coded data;
third logic means in each of said filter means for generating a third control signal when said counting means reaches a predetermined count;
a second storage means coupled to said first storage means and said first logic means; and
said first logic means being coupled to said second and third logic means for outputting a fourth control signal to said second storage means in response to the generating of said start and ending data bits and said third control signal, said fourth control signal enabling the second storage means to store the coded data stored in said first storage means.

17. A method for decoding data representing a coded label consisting of a plurality of bars and spaces representing a numerical character in which character data is generated by scanning a bar code label which may represent one of a plurality of different types of bar code labels, comprising the steps of:
applying a first predetermined relationship to said character data representing a predetermined number of bars and spaces defining a number of numerical characters;
generating first control signals indicating the occurrence of said number of numerical characters;
transmitting said first control signals simultaneously to a plurality of filter circuits each representing a different type of bar code label;
operating each of said filter circuits in response to receiving said first control signals to detect the occurrence of a valid numerical character associated with the type of bar code represented by the filter circuit; and
generating second control signals locating the position of the valid numerical character in the character data associated with the type of bar code represented by the filter circuit.

18. The method of claim 17, in which said filter circuits are operated in parallel.

19. The method of claim 17, in which the transmitting step includes the transmission of signals to one of said filter circuits if a predetermined number of intervals have been detected during scanning of a bar code label.

20. The method of claim 17, in which the transmitting step includes the transmission of signals to one of said filter circuits if the presence of two equal characters is detected during scanning of a bar code label.

21. The method of claim 17 which further includes the steps of:
storing the generated data in a first storage means;
transmitting the second control signals to said first storage means locating the position of the valid numerical character in the first storage means; and
storing the second control signals in said first storage means at a location locating the start and ending of a valid numerical character in said generated data.

22. The method of claim 21 which further includes the step of storing in said first storage means a third control signal with the second control signals indicating the type of bar code the valid numerical character is associated with.

23. The method of claim 17 in which said number of numerical characters is two.

24. The method of claim 22 which further includes the steps of:
storing the generated data stored in said first storage means in a second storage means;
counting the number of first signals generated until a predetermined count is reached;
generating a third control signal when said first predetermined count is reached; and
enabling said second storage means to store the generated data in response to the generation of said third control signal.

25. The method of claim 24 which further includes the steps of comparing the first predetermined count with a second predetermined count and generating said second control signals when the first and second predetermined counts are equal.

* * * * *